(12) United States Patent
Kojima et al.

(10) Patent No.: US 9,772,490 B2
(45) Date of Patent: *Sep. 26, 2017

(54) OPTICAL SCANNER, IMAGE DISPLAY DEVICE, HEAD MOUNT DISPLAY, AND HEADS-UP DISPLAY

(71) Applicant: Seiko Epson Corporation, Tokyo (JP)

(72) Inventors: Hisako Kojima, Chino (JP); Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 1 day.

This patent is subject to a terminal disclaimer.

(21) Appl. No.: 14/525,574

(22) Filed: Oct. 28, 2014

(65) Prior Publication Data

US 2015/0116805 A1   Apr. 30, 2015

(30) Foreign Application Priority Data

Oct. 29, 2013   (JP) .................. 2013-223978

(51) Int. Cl.
   *G02B 26/08*   (2006.01)
   *G02B 26/10*   (2006.01)
   *G02B 27/01*   (2006.01)

(52) U.S. Cl.
   CPC ......... *G02B 26/085* (2013.01); *G02B 26/101* (2013.01); *G02B 27/0101* (2013.01); *G02B 27/0172* (2013.01)

(58) Field of Classification Search
   CPC G02B 26/0841; G02B 26/105; G02B 26/085; G02B 26/0858; G02B 26/0833;

(Continued)

(56) References Cited

U.S. PATENT DOCUMENTS 5,912,608 A    6/1999 Asada
6,285,485 B1 * 9/2001 Ferreira .................. H02K 33/00
                                                              310/36

(Continued)

FOREIGN PATENT DOCUMENTS

EP    1275997 A2   1/2003
EP    1881358 A1   1/2008

(Continued)

OTHER PUBLICATIONS

Please use the abstract of WO2007/001682 as an explanation of relevance for JP2008-547056.

(Continued)

*Primary Examiner* — Jennifer L. Doak
(74) *Attorney, Agent, or Firm* — Harness, Dickey & Pierce, P.L.C.

(57) ABSTRACT

An optical scanner includes: a movable plate which includes a light reflection unit; a first torsion bar spring which oscillatably supports the movable plate around a first axis; a displacement portion which is connected to the first torsion bar spring; a second torsion bar spring which oscillatably supports the displacement portion around a second axis intersecting with the first axis; a permanent magnet which is provided on the displacement portion to be inclined with respect to the first axis and the second axis; and a coil which is provided to be separated from the displacement portion and generates a magnetic field acting on the permanent magnet. The displacement portion includes a frame surrounding the movable plate, and a damper which has a smaller thickness than that of the frame and extends in a direction intersecting with a direction in which the second torsion bar spring extends from the frame.

16 Claims, 11 Drawing Sheets

(58) Field of Classification Search
CPC ..... G02B 26/101; B81B 3/0083; B81B 3/881; B81B 83/0086; B81B 83/881; B81B 2203/04
See application file for complete search history.

(56) References Cited

U.S. PATENT DOCUMENTS

| | | | |
|---|---|---|---|
| 6,388,789 B1* | 5/2002 | Bernstein | B81B 3/0021 359/198.1 |
| 7,170,665 B2* | 1/2007 | Kaneko | G02B 7/02 310/22 |
| 7,416,126 B2 | 8/2008 | Wittenberg et al. | |
| 7,570,406 B2 | 8/2009 | Mizoguchi et al. | |
| 7,688,490 B2 | 3/2010 | Mizoguchi | |
| 7,697,181 B2 | 4/2010 | Mizoguchi | |
| 7,724,411 B2 | 5/2010 | Ko et al. | |
| 7,777,927 B2 | 8/2010 | Mizoguchi et al. | |
| 8,089,673 B2 | 1/2012 | Mizoguchi et al. | |
| 8,254,006 B2 | 8/2012 | Miyagawa et al. | |
| 2004/0070806 A1 | 4/2004 | Ryu et al. | |
| 2006/0139719 A1* | 6/2006 | Nishio | G02B 26/085 359/212.1 |
| 2007/0268099 A1 | 11/2007 | Jeong et al. | |
| 2008/0018974 A1 | 1/2008 | Cho et al. | |
| 2008/0226312 A1 | 9/2008 | Mizoguchi et al. | |
| 2013/0278985 A1 | 10/2013 | Hino et al. | |
| 2013/0301099 A1 | 11/2013 | Mizoguchi et al. | |
| 2013/0301100 A1 | 11/2013 | Mizoguchi et al. | |
| 2014/0071510 A1 | 3/2014 | Mizuno et al. | |

FOREIGN PATENT DOCUMENTS

| | | |
|---|---|---|
| JP | 08-322227 A | 3/1996 |
| JP | 2004-266957 A | 9/2004 |
| JP | 2005-250077 A | 9/2005 |
| JP | 2007-312592 A | 11/2007 |
| JP | 2008-026849 A | 2/2008 |
| JP | 2008-203497 A | 9/2008 |
| JP | 2008-216597 A | 9/2008 |
| JP | 2008-310043 A | 12/2008 |
| JP | 2008-547056 A | 12/2008 |
| JP | 2009-020367 A | 1/2009 |
| JP | 4232834 B2 | 3/2009 |
| JP | 4232835 B2 | 3/2009 |
| JP | 4329831 B2 | 9/2009 |
| JP | 2010-019933 A | 1/2010 |
| JP | 2010-019934 A | 1/2010 |
| JP | 2010-054944 A | 3/2010 |
| JP | 4984987 B2 | 7/2012 |
| JP | 2012-150350 A | 8/2012 |
| JP | 5045611 B2 | 10/2012 |
| JP | 5085476 B2 | 11/2012 |
| JP | 2013-035081 A | 2/2013 |
| JP | 2013-101198 A | 5/2013 |
| JP | 2013-101199 A | 5/2013 |
| JP | 2013-104880 A | 5/2013 |
| JP | 5206610 B2 | 6/2013 |
| JP | 2013-228424 A | 11/2013 |
| JP | 2013-235200 A | 11/2013 |
| JP | 2013-235213 A | 11/2013 |
| JP | 2013-242455 A | 12/2013 |
| JP | 2014-021424 A | 2/2014 |
| JP | 2014-041234 A | 3/2014 |
| JP | 2014-048615 A | 3/2014 |
| JP | 2014-056132 A | 3/2014 |
| JP | 2014-056211 A | 3/2014 |

OTHER PUBLICATIONS

Please use the abstract of JP2010-079266 as an explanation of relevance for JP5206610.
Please use the abstract of JP2010-049199 as an explanation of relevance for JP5045611.
Please use the abstract of JP2008-228437 as an explanation of relevance for JP4329831.
Please use the abstract of JP2008-228436 as an explanation of relevance for JP4984987.
Please use the abstract of JP2008-216921 as an explanation of relevance for JP4232835.
Please use the abstract of JP2008-216920 as an explanation of relevance for JP4232834.
Extended European Search Report for Application No. EP 14 19 0450 dated Mar. 6, 2015 (6 pages).
Extended Search Report for European Patent Application No. 14190449.0, dated Mar. 6, 2015 (6 pages).

* cited by examiner

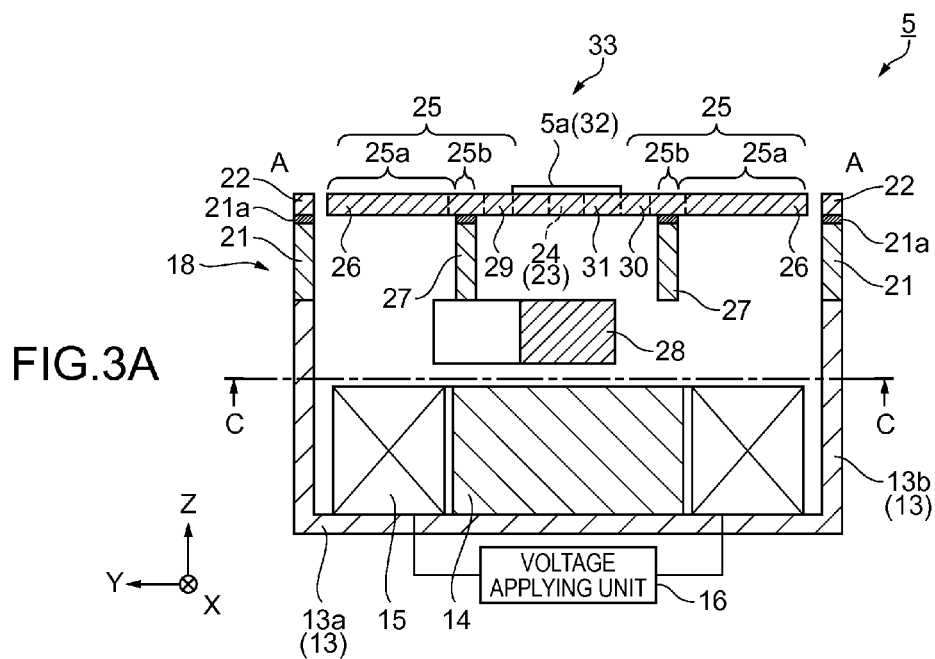
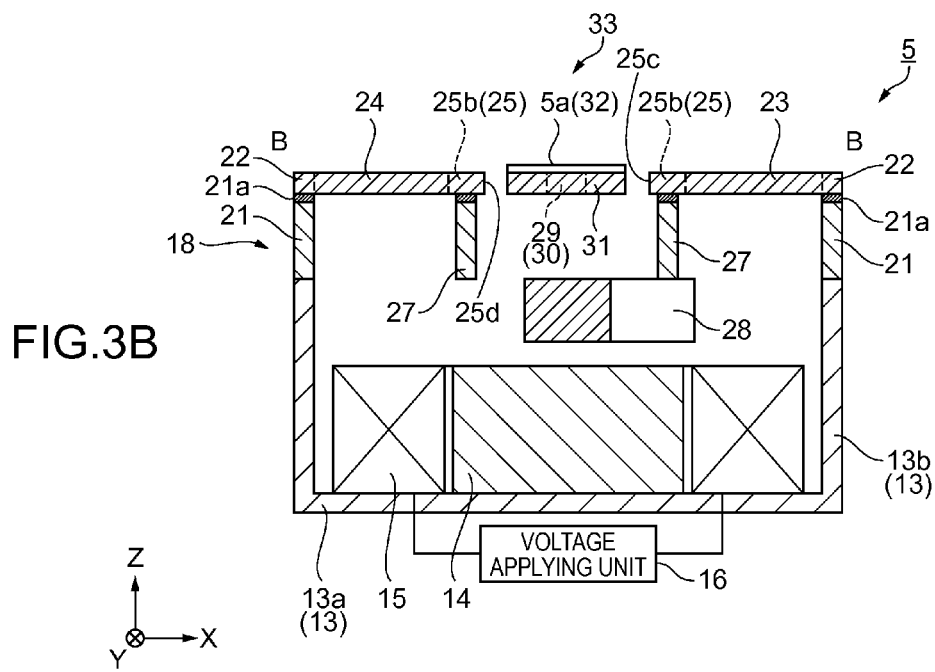

OPTICAL SCANNER, IMAGE DISPLAY DEVICE, HEAD MOUNT DISPLAY, AND HEADS-UP DISPLAY

BACKGROUND

1. Technical Field

The present invention relates to an optical scanner, an image display device, a head mount display, and a heads-up display.

2. Related Art

An optical scanner for performing drawing by optical scanning has been used in a laser printer or an image display device. JP-A-2008-216921 discloses an optical scanner including torsion bar springs in two directions which are orthogonal to each other. According to this, in the optical scanner, a movable plate is oscillatably supported by a pair of first torsion bar springs. The other end of the first torsion bar spring is connected to a frame-shaped displacement portion. In addition, the displacement portion is oscillatably supported by a second torsion bar spring. The other end of the second torsion bar spring is supported by a frame-shaped support portion. A direction in which the first torsion bar spring extends is set as a first direction, and a direction in which the second torsion bar spring extends is set as a second direction. The first direction and the second direction are orthogonal to each other. Accordingly, the movable plate can be oscillated by using the two directions orthogonal to each other as rotation axes.

A permanent magnet is provided on the displacement portion. The permanent magnet is installed to be inclined by 45° with respect to the first direction. An electromagnet is installed in a position facing and separated from the permanent magnet. A driving signal obtained by synthesizing a vertical scanning driving signal at a frequency of approximately 60 Hz having a saw-tooth wave and a horizontal scanning driving signal at a frequency of approximately 25 KHz having a sine wave is input to the electromagnet. At that time, the movable plate is operated with respect to the displacement portion to correspond to the horizontal scanning driving signal. The displacement portion is operated with respect to the support portion to correspond to the vertical scanning driving signal.

JP-A-2005-250077 discloses an optical scanner including torsion bar springs in one direction. According to this, in the optical scanner, a first movable plate is oscillatably supported by a pair of the torsion bar springs. One torsion bar spring portion is fixed to a support body. The other torsion bar spring portion is connected to a second movable plate. A coil is installed on the second movable plate, a magnetic field acts on the coil, and accordingly the second movable plate is oscillated. The first movable plate oscillates by oscillation of the second movable plate. The second movable plate has a damper structure. A Q value of the optical scanner is decreased by the damper structure.

A miniaturized optical scanner is desirable in order to use the optical scanner in a portable device. When miniaturizing the optical scanner disclosed in JP-A-2008-216921, it is also necessary to miniaturize the displacement portion. When this is done, the displacement portion to be operated only corresponding to the vertical scanning driving signal is easily operated corresponding to the horizontal scanning driving signal. As a result, the movable plate is operated with an oscillation component which is unnecessary for the vertical scanning. Therefore, an optical scanner having an improved vibration performance so that the horizontal scanning hardly affects the vertical scanning even with the miniaturized optical scanner, has been desired.

SUMMARY

An advantage of some aspects of the invention is to solve the problems described above, and the invention can be implemented as the following forms or application examples.

Application Example 1

This application example is directed to an optical scanner including: a movable plate which includes a light reflection unit which reflects light; a first torsion bar spring portion which oscillatably supports the movable plate around a first axis; a displacement portion which is connected to the first torsion bar spring portion; a second torsion bar spring portion which oscillatably supports the displacement portion around a second axis intersecting with the first axis; a permanent magnet which is provided on the displacement portion so that a line segment for connecting one magnetic pole and the other magnetic pole is inclined with respect to the first axis and the second axis; and a coil which is provided to be separated from the displacement portion and generates a magnetic field acting on the permanent magnet, in which the displacement portion includes a frame portion surrounding the movable plate, and a damper portion which has a smaller thickness than that of the frame portion and extends in a direction intersecting with a direction in which the second torsion bar spring portion extends from the frame portion.

According to this application example, one end of the first torsion bar spring portion supports the movable plate and the other end of the first torsion bar spring portion is connected to the displacement portion. The displacement portion is supported by the second torsion bar spring portion. The direction in which the first torsion bar spring portion extends and the direction in which the second torsion bar spring portion extends intersect with each other. The movable plate oscillates around the first axis which is an axis of the first torsion bar spring portion, and the displacement portion oscillates around the second axis which is an axis of the second torsion bar spring portion. Accordingly, the light reflection unit oscillates around axes in two directions intersecting with each other.

The permanent magnet is fixed to the displacement portion. The coil which generates the magnetic field on the permanent magnet to drive the displacement portion is installed. By driving the displacement portion with the electrical connection of the coil, the optical scanner can cause the light reflection unit to oscillate around axes in two directions intersecting with each other. The displacement portion includes the frame portion and the damper portion. The frame portion maintains a relative position of the first torsion bar spring portion and the second torsion bar spring portion. The damper portion extends from the frame portion in a direction orthogonal to the direction in which the second torsion bar spring portion extends. When the displacement portion oscillates around the second axis, the damper portion functions as a damper by generating an air current around the damper portion. Accordingly, it is possible to set the displacement portion to resist reacting with respect to the driving with a high frequency. Thus, when the light reflection unit oscillates around the axis of the second torsion bar spring portion, it is possible to set the light reflection unit to resist reacting with respect to the high frequency driving. As a result, it is possible to improve the vibration performance of the light reflection unit.

Application Example 2

In the optical scanner according to the application example described above, a thickness of the damper portion at a position separated from the second torsion bar spring portion is greater than a thickness thereof at a position closer to the second torsion bar spring portion.

According to this application example, the damper portion becomes thicker at the position separated from the second torsion bar spring portion than that at the position closer thereto. Accordingly, it is possible to increase an inertia moment of the displacement portion, compared to when the thickness of the damper portion at the position separated from the second torsion bar spring portion is thin. Accordingly, it is possible to set the displacement portion to resist reacting with respect to the high frequency driving. Thus, when the light reflection unit oscillates around the second axis, it is possible to set the light reflection unit to resist reacting with respect to the high frequency driving. As a result, it is possible to improve the vibration performance of the light reflection unit.

Application Example 3

In the optical scanner according to the application example described above, the displacement portion includes a thin plate structure portion which has a smaller thickness than that of the frame portion and extends in a direction in which the second torsion bar spring portion extends from the frame portion, and a connection portion of the second torsion bar spring portion and the thin plate structure portion has a circular arc shape.

According to this application example, the displacement portion includes the thin plate structure portion continued from the frame portion. Since a thickness of the thin plate structure portion is smaller than that of the frame portion, the thin plate structure portion is more easily deformed than the frame portion. The second torsion bar spring portion is connected to the thin plate structure portion. Accordingly, the displacement portion and the second torsion bar spring portion can cause the stress to be hardly generated when the second torsion bar spring portion is twisted, compared to when the second torsion bar spring portion is connected to the frame portion. The connection portion of the second torsion bar spring portion and the thin plate structure portion has a circular arc shape. Accordingly, the displacement portion can cause the stress to be hardly generated on the connection portion when the second torsion bar spring portion is twisted.

Application Example 4

In the optical scanner according to the application example described above, the light reflection unit includes a reflection plate and a support which supports the reflection plate, and the reflection plate and the displacement portion are installed at an interval in a thickness direction of the reflection plate, and a part of the reflection plate in a plan view seen from a thickness direction of the reflection plate is overlapped with the displacement portion.

According to this application example, the reflection plate and the displacement portion are installed at an interval. In a plan view seen from a thickness direction of the reflection plate, the reflection plate is overlapped with the displacement portion. In this configuration, a length of the displacement portion can be set to be small, compared to when the reflection plate and the displacement portion are positioned on the same plane. Accordingly, when the displacement portion is short, it is possible to obtain excellent responsiveness with respect to the driving at a high frequency, compared to when the displacement portion is long. Therefore, the optical scanner can have excellent responsiveness with respect to the driving at a high frequency.

Application Example 5

In the optical scanner according to the application example described above, a portion of the damper portion at a position with a great thickness is protruded to the opposite side to the side where the permanent magnet is installed with respect to the displacement portion.

According to this application example, the side where the permanent magnet is installed with respect to the displacement portion and the side where a portion of the damper portion at the position with a great thickness is protruded are opposite to each other. Accordingly, a gravity center of the displacement portion can be set to be close to the axis of the second torsion bar spring portion. Therefore, it is possible to reduce combined stress due to the torsion stress and bending stress applied to the second torsion bar spring portion, and to increase reliability with respect to the damage to the beams.

Application Example 6

This application example is directed to an image display device including: a light source which emits light; and an optical scanner, in which the optical scanner includes a movable plate which includes a light reflection unit which reflects light; a first torsion bar spring portion which oscillatably supports the movable plate around a first axis; a displacement portion which is connected to the first torsion bar spring portion; a second torsion bar spring portion which oscillatably supports the displacement portion around a second axis intersecting with the first axis; a permanent magnet which is provided on the displacement portion so that a line segment for connecting one magnetic pole and the other magnetic pole is inclined with respect to the first axis and the second axis; and a coil which is provided to be separated from the displacement portion and generates a magnetic field acting on the permanent magnet, and the displacement portion includes a frame portion surrounding the movable plate, and a damper portion which has a smaller thickness than that of the frame portion and extends in a direction intersecting with a direction in which the second torsion bar spring portion extends from the frame portion.

According to this application example, the light reflection unit reflects the light emitted from the light source. Since the light reflection unit oscillates around the axes of the two directions intersecting with each other, the image display device may display an image by changing a movement direction of the light. When the displacement portion oscillates around the second axis, the damper portion functions as a damper due to the air current flowing around the damper portion. Accordingly, it is possible to set the displacement portion to resist reacting with respect to the high frequency driving. Thus, when the light reflection unit oscillates around the second axis, it is possible to set the light reflection unit to resist reacting with respect to the high frequency driving. As a result, the image display device can improve the vibration performance of the light reflection unit.

Application Example 7

This application example is directed to a head mount display including: a frame to be mounted on a head of a viewer; a light source which emits light; and an optical scanner provided on the frame, in which the optical scanner includes a movable plate which includes a light reflection unit which reflects light; a first torsion bar spring portion which oscillatably supports the movable plate around a first axis; a displacement portion which is connected to the first torsion bar spring portion; a second torsion bar spring portion which oscillatably supports the displacement portion around a second axis intersecting with the first axis; a permanent magnet which is provided on the displacement portion so that a line segment for connecting one magnetic pole and the other magnetic pole is inclined with respect to the first axis and the second axis; and a coil which is provided to be separated from the displacement portion and generates a magnetic field acting on the permanent magnet, and the displacement portion includes a frame portion surrounding the movable plate, and a damper portion which has a smaller thickness than that of the frame portion and extends in a direction intersecting with a direction in which the second torsion bar spring portion extends from the frame portion.

According to this application example, a viewer can mount the head mount display on the viewer's head by using the frame. In the head mount display, the light source emits light to the optical scanner. In the optical scanner, the light reflection unit reflects the light emitted from the light source. Since the light reflection unit oscillates around the axes of the two directions intersecting with each other, the optical scanner can display an image by changing the movement direction of the light. When the displacement portion oscillates around the second axis, the damper portion functions as a damper by flowing the air current around the damper portion. Accordingly, it is possible to set the displacement portion to resist reacting with respect to the high frequency driving. Thus, when the light reflection unit oscillates around the second axis, it is possible to set the light reflection unit to resist reacting with respect to the high frequency driving. As a result, the head mount display can be set as a device including an optical scanner having excellent vibration performance.

Application Example 8

This application example is directed to a heads-up display which emits light on a windshield of a vehicle, including: a light source which emits light; and an optical scanner, in which the optical scanner includes a movable plate which includes a light reflection unit which reflects light; a first torsion bar spring portion which oscillatably supports the movable plate around a first axis; a displacement portion which is connected to the first torsion bar spring portion; a second torsion bar spring portion which oscillatably supports the displacement portion around a second axis intersecting with the first axis; a permanent magnet which is provided on the displacement portion so that a line segment for connecting one magnetic pole and the other magnetic pole is inclined with respect to the first axis and the second axis; and a coil which is provided to be separated from the displacement portion and generates a magnetic field acting on the permanent magnet, and the displacement portion includes a frame portion surrounding the movable plate, and a damper portion which has a smaller thickness than that of the frame portion and extends in a direction intersecting with a direction in which the second torsion bar spring portion extends from the frame portion.

According to this application example, in the heads-up display, the optical scanner emits the light emitted by the light source on a windshield of a vehicle. In the optical scanner, the light reflection unit reflects the light emitted from the light source. Since the light reflection unit oscillates around the axes of the two directions intersecting with each other, the heads-up display can display an image by changing the movement direction of the light. When the displacement portion oscillates around the second axis, the damper portion functions as a damper due to the air current flowing around the damper portion. Accordingly, it is possible to set the displacement portion to resist reacting with respect to the high frequency driving. Thus, when the light reflection unit oscillates around the second axis, it is possible to set the light reflection unit to resist reacting with respect to the high frequency driving. As a result, the heads-up display can be set as a device including an optical scanner with excellent vibration performance.

BRIEF DESCRIPTION OF THE DRAWINGS

Embodiments of the invention will be described with reference to the accompanying drawings, wherein like numbers reference like elements.

FIGS. 3A and 3B are schematic cross-sectional side views showing a structure of an optical scanner.

FIGS. 8A and 8B illustrate a second embodiment, in which FIG. 8A is a schematic plan view showing a structure of an optical scanner and FIG. 8B is a schematic cross-sectional side view showing a structure of an optical scanner.

FIGS. 9A and 9B illustrate a third embodiment, in which FIG. 9A is a schematic plan view showing a structure of an optical scanner and FIG. 9B is a schematic cross-sectional side view showing a structure of an optical scanner.

FIGS. 10A and 10B illustrate a fourth embodiment, in which FIG. 10A is a schematic plan view showing a structure of an optical scanner and FIG. 10B is a schematic cross-sectional side view showing a structure of an optical scanner.

DESCRIPTION OF EXEMPLARY EMBODIMENTS

In the embodiments, characteristic examples of an image display device, an optical scanner, a heads-up display, a head mount display, and a manufacturing method of the optical scanner will be described with reference to accompanying drawings. Since each member in each drawing is shown with a size to be recognized in each drawing, the drawings are shown with different reduction scales for each member.

First Embodiment

Image Display Device

Figure 1:
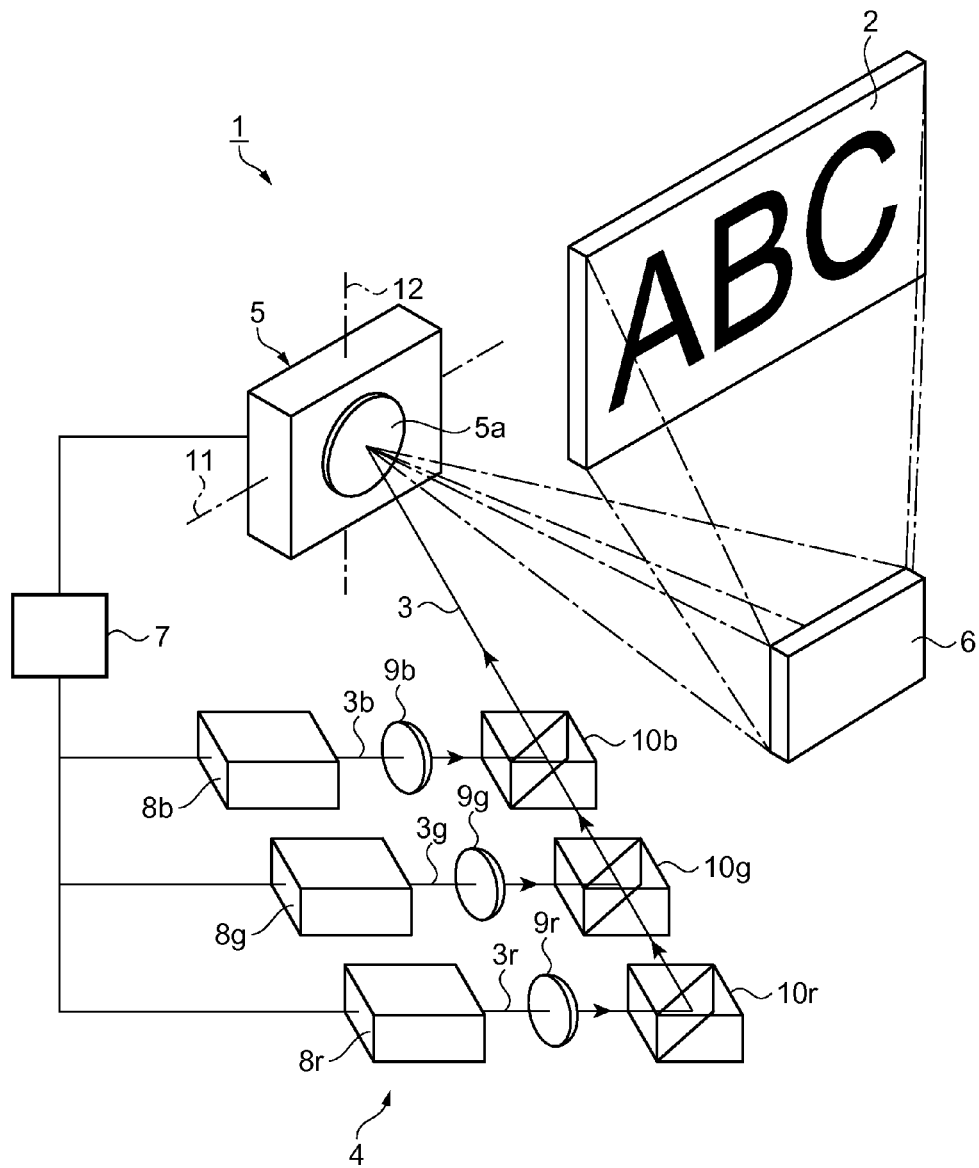
FIG. 1 is a schematic perspective view showing a configuration of an image display device according to a first embodiment.

A configuration of an image display device will be described with reference to FIG. 1. FIG. 1 is a schematic perspective view showing a configuration of an image display device. An image display device 1 shown in FIG. 1 is a device which displays an image by two-dimensionally scanning drawing laser light 3 as light on a screen 2 such as a screen or a wall surface. The image display device 1 includes a drawing light source unit 4 which emits the drawing laser light 3, an optical scanner 5 which scans the drawing laser light 3, a mirror 6 which reflects the drawing laser light 3 scanned by the optical scanner 5, and a control unit 7 which controls operations of the drawing light source unit 4 and the optical scanner 5. The mirror 6 may be provided if desired, and may be omitted.

The drawing light source unit 4 includes laser light sources 8r, 8g, and 8b as red, green, and blue light sources, collimator lenses 9r, 9g, 9b and dichroic mirrors 10r, 10g, and 10b which are provided to correspond to the laser light sources 8r, 8g, and 8b.

Each of the laser light sources 8r, 8g, and 8b includes a driving circuit (not shown) which drives the light source. The laser light source 8r emits a red laser light beam 3r, the laser light source 8g emits a green laser light beam 3g, and the laser light source 8b emits a blue laser light beam 3b. Each of the laser light beams 3r, 3g, and 3b is emitted corresponding to a driving signal transmitted from the control unit 7, and is set to a parallel light beam or an approximately parallel light beam by the collimator lenses 9r, 9g, and 9b. As the laser light sources 8r, 8g, and 8b, a semiconductor laser such as an edge emitting semiconductor laser or a surface emitting semiconductor laser can be used, for example. By using the semiconductor laser, it is possible to provide miniaturized laser light sources 8r, 8g, and 8b.

The dichroic mirror 10r, the dichroic mirror 10g, and the dichroic mirror 10b are disposed according to the disposition of the laser light sources 8r, 8g, and 8b. The dichroic mirror 10r has a property of reflecting the laser light beam 3r. The dichroic mirror 10g has a property of reflecting the laser light beam 3g and transmitting the laser light beam 3r. The dichroic mirror 10b has a property of reflecting the laser light beam 3b and transmitting the laser light beams 3r and 3g. Laser light beams 3r, 3g, and 3b with these colors are synthesized to be the drawing laser light 3 by the dichroic mirrors 10r, 10g, and 10b.

The optical scanner 5 includes a reflection surface 5a as a light reflection unit, and the drawing laser light 3 emitted by the drawing light source unit 4 is emitted to the reflection surface 5a. The optical scanner 5 oscillates the reflection surface 5a by using a horizontal axis 11 as a second axis, and oscillates the reflection surface 5a by using a vertical axis 12 as a first axis. Accordingly, the drawing laser light 3 can be scanned in two directions of the vertical and horizontal directions. That is, the optical scanner 5 has a function of two-dimensionally scanning the drawing laser light 3. The drawing laser light 3 reflected by the reflection surface 5a is reflected by the mirror 6 and emitted to the screen 2. Accordingly, a predetermined pattern is drawn on the screen 2.

Figure 2A:
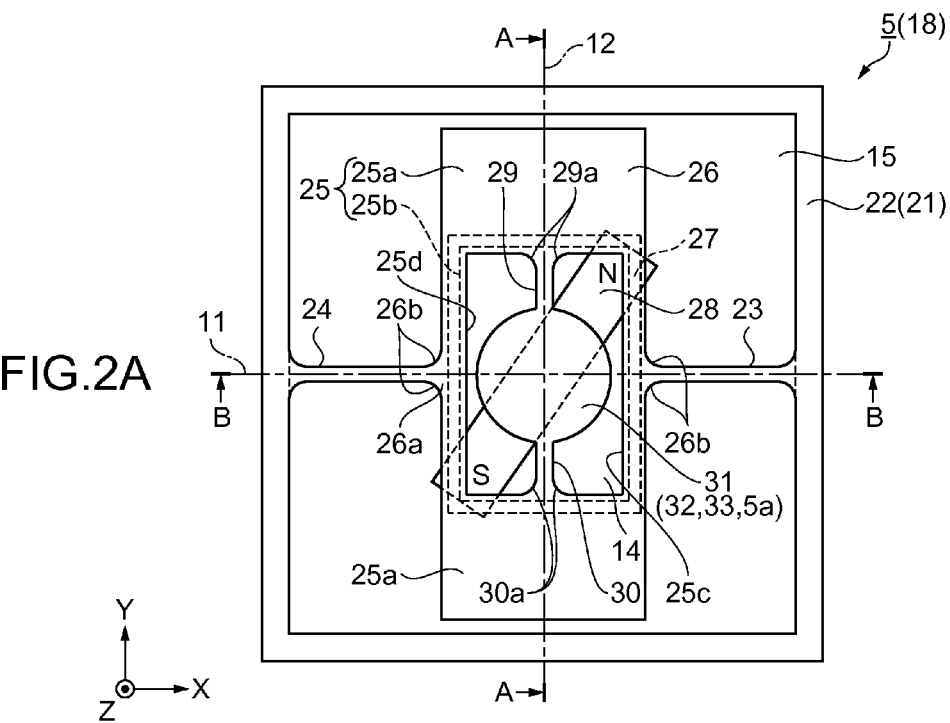
FIG. 2A is a schematic top view showing a structure of an optical scanner and FIG. 2B is a schematic cross-sectional plan view showing a structure of an optical scanner.
Figure 2B:
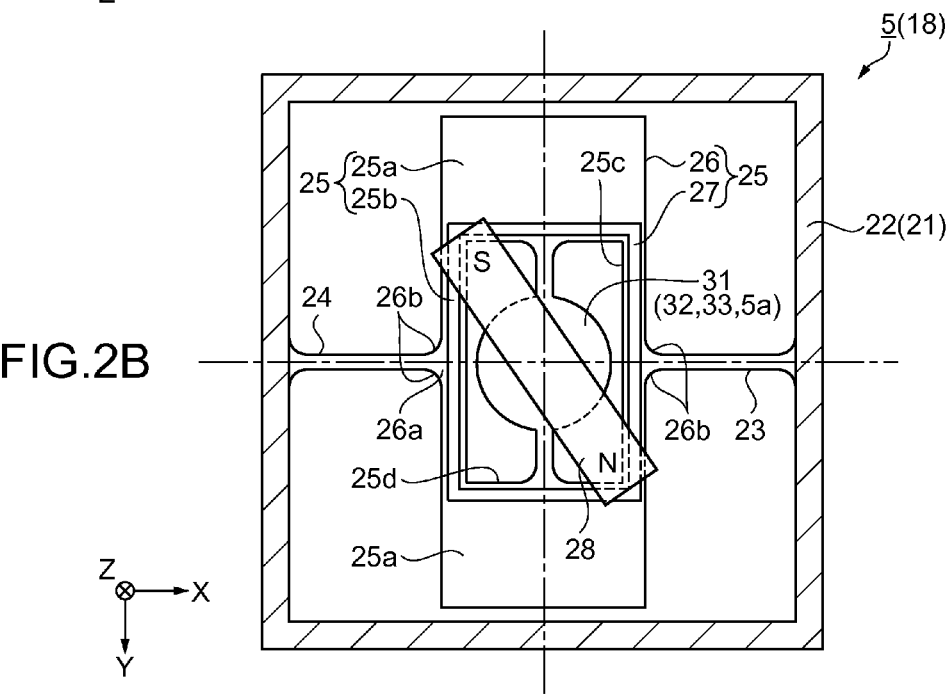

FIG. 2A is a schematic top view showing a structure of the optical scanner and FIG. 2B is a schematic cross-sectional plan view showing a structure of the optical scanner. FIG. 2B is a diagram of the optical scanner 5 seen from a bottom surface side. FIGS. 3A and 3B are schematic cross-sectional side views showing a structure of the optical scanner. FIG. 3A shows a cross section taken along line A-A of FIG. 2A and FIG. 3B shows a cross section taken along line B-B of FIG. 2A. FIG. 2B shows a cross section taken along line C-C of FIG. 3A. As shown in FIGS. 2A to 3B, the optical scanner 5 includes a bottomed square tubular housing 13, and a planar shape of a bottom plate 13a of the housing 13 is a square. A square tubular sideplate 13b is provided to stand on the bottom plate 13a. A core 14 and a coil 15 are installed on the bottom plate 13a in the housing 13. The core 14 has a prismatic shape and the coil 15 is disposed to surround the core 14. The shape of the core 14 is not limited to a prism and may, for example, be a cylinder. An electromagnet is configured with the core 14 and the coil 15. A voltage applying unit 16 is connected to the coil 15 and the voltage applying unit 16 supplies current to the coil 15.

A direction in which one side of the bottom plate 13a of the housing 13 extends is set as an X direction. The X direction is a direction in which the horizontal axis 11 extends. A direction orthogonal to the X direction in the bottom plate is set as a Y direction. The Y direction is a direction in which the vertical axis 12 extends. A thickness direction of the core 14 is set as a Z direction. The side plate 13b of the housing 13 extends from the bottom plate 13a in the Z direction. The Z direction is a direction which the reflection surface 5a faces. The X direction, the Y direction, and the Z direction are orthogonal to each other. The drawing laser light 3 is emitted from the Z direction, and the drawing laser light 3 reflected by the reflection surface 5a moves in the Z direction.

A structure 18 is installed on the housing 13. The structure 18 includes a support connection portion 21 having a square tubular shape when seen from the Z direction side, and the support connection portion 21 is installed to be overlapped with the side plate 13b. An oxide film 21a is installed on a surface of the support connection portion 21 facing the Z direction side. A square frame-shaped supporting portion 22 is installed on the Z direction side of the support connection portion 21. The shapes of the supporting portion 22 and the support connection portion 21 seen from the Z direction side are approximately the same.

A third shaft portion 23 and a fourth shaft portion 24 as a second torsion bar spring portion which extends in the X direction are installed at the center of the supporting portion 22 in the Y direction. The third shaft portion 23 and the fourth shaft portion 24 face each other and are disposed along the horizontal axis 11. A displacement portion 25 is installed between the third shaft portion 23 and the fourth shaft portion 24. The displacement portion 25 has a square frame shape and is a rectangle having long sides in the Y direction.

One end of the third shaft portion 23 is connected to the supporting portion 22 and the other end thereof is connected to the displacement portion 25. In the same manner as described above, one end of the fourth shaft portion 24 is connected to the supporting portion 22 and the other end thereof is connected to the displacement portion 25. Accordingly, the third shaft portion 23 and the fourth shaft portion 24 have a structure oscillatably supporting the displacement portion 25.

The third shaft portion 23 and the fourth shaft portion 24 function as a pair of torsion bar springs, and the displacement portion 25 oscillates by using the horizontal axis 11 as a rotation axis. The planar shape of the portions of the third shaft portion 23 and the fourth shaft portion 24 connected to the supporting portion 22 is a circular arc. Accordingly, it is possible to suppress stress concentrated to the portions connected to the supporting portion 22 by the third shaft portion 23 and the fourth shaft portion 24.

The displacement portion 25 is configured with a plate-shaped member 26 and a magnetic supporting portion 27 as a frame portion. The magnetic supporting portion 27 is positioned on the negative Z direction side of the plate-shaped member 26 and has a square tubular shape. A part of the displacement portion 25 positioned on the positive Y direction side of the magnetic supporting portion 27 is set as a first thin plate structure portion 25a as a damper portion. A part of the displacement portion 25 positioned on the negative Y direction side of the magnetic supporting portion 27 is also set as the first thin plate structure portion 25a. Accordingly, the first thin plate structure portion 25a, a frame portion 25b, and the first thin plate structure portion 25a are disposed in this order on the displacement portion 25 in the Y direction. The first thin plate structure portion 25a is configured with a part of the plate-shaped member 26. A part including the magnetic supporting portion 27 and positioned inside of the magnetic supporting portion 27 is set as the frame portion 25b. The frame portion 25b is configured with a part of the plate-shaped member 26 and the magnetic supporting portion 27. A thickness of the first thin plate structure portion 25a is a thickness of the plate-shaped member 26, and a thickness of the frame portion 25b is a thickness obtained by adding a thickness of the magnetic supporting portion 27 to the thickness of the plate-shaped member 26. Accordingly, the first thin plate structure portion 25a has a small thickness and the frame portion 25b has a great thickness.

The plate-shaped member 26 includes a portion in the positive X direction side and the negative X direction side of the magnetic supporting portion 27 not overlapped with the magnetic supporting portion 27. This portion not overlapped with the magnetic supporting portion 27 is set as a second thin plate structure portion 26a as a thin plate structure portion. The third shaft portion 23 and the fourth shaft portion 24 are connected to the second thin plate structure portion 26a. A planar shape of a connection portion 26b where the third shaft portion 23 and the fourth shaft portion 24 are connected to the second thin plate structure portion 26a is a circular arc. Accordingly, the third shaft portion 23 and the fourth shaft portion 24 prevent the occurrence of stress concentration to the connection portion 26b at the time of twisting.

A permanent magnet 28 is installed on the magnetic supporting portion 27 on the core 14 side. The permanent magnet 28 is driven by the electromagnet formed of the coil 15 and the core 14.

A first shaft portion 29 as a first torsion bar spring portion and a second shaft portion 30 as a first torsion bar spring portion which extend in the Y direction are installed at the center of the displacement portion 25 in the X direction. The first shaft portion 29 and the second shaft portion 30 face each other and are disposed along the vertical axis 12. A movable plate 31 is installed between the first shaft portion 29 and the second shaft portion 30. The movable plate 31 has a disc shape, and a surface on the Z direction side of the movable plate 31 is set as the reflection surface 5a. A hole positioned on the X direction side of the first shaft portion 29 and the second shaft portion 30 in the displacement portion 25 is set as a first hole 25c, and a hole positioned on the negative X direction side of the first shaft portion 29 and the second shaft portion 30 is set as a second hole 25d.

One end of the first shaft portion 29 is connected to the plate-shaped member 26 and the other end thereof is connected to the movable plate 31. In the same manner as described above, one end of the second shaft portion 30 is connected to the plate-shaped member 26 and the other end thereof is connected to the movable plate 31. Accordingly, the first shaft portion 29 and the second shaft portion 30 have a structure supporting the movable plate 31. The first shaft portion 29 and the second shaft portion 30 function as a pair of torsion bar springs, and the movable plate 31 oscillates by using the vertical axis 12 as a rotation axis. Planar shapes of a connection portion 29a and a connection portion 30a where the first shaft portion 29 and the second shaft portion 30 are connected to the plate-shaped member 26 are arcs. Accordingly, the first shaft portion 29 and the second shaft portion 30 prevent the occurrence of stress concentration to the connection portion 29a and the connection portion 30a at the time of twisting.

The movable plate 31 configures a first vibration system for performing oscillation or reciprocating by using the vertical axis 12 as a rotation axis. The first shaft portion 29 and the second shaft portion 30 function as torsion bar springs, and the first shaft portion 29 and the second shaft portion 30 have a predetermined spring constant. A natural frequency when the movable plate 31 oscillates is determined by the spring constant of the first shaft portion 29 and the second shaft portion 30 and mass of the movable plate 31. The torsion bar spring is also referred to as a torsion bar. The displacement portion 25 configures a second vibration system for performing oscillation or reciprocating by using the horizontal axis 11 as a rotation axis. The permanent magnet 28, the coil 15, the core 14, and the voltage applying unit 16 configure a driving unit which drives the first vibration system and the second vibration system described above.

The movable plate 31 oscillates by using the vertical axis 12 as a rotation axis, and the displacement portion 25 oscillates by using the horizontal axis 11 as a rotation axis. Accordingly, the movable plate 31 and the reflection surface 5a can oscillate around two axes of the horizontal axis 11 and the vertical axis 12 which are orthogonal to each other. The shapes of the first shaft portion 29, the second shaft portion 30, the third shaft portion 23, and the fourth shaft portion 24 are not limited as described above, and may have at least a bent or curved portion or a branched portion in the middle thereof, for example. Each of the first shaft portion 29, the second shaft portion 30, the third shaft portion 23, and the fourth shaft portion 24 may be divided into two and be formed to have two axes.

A reflection film 32 as a light reflection unit is installed on the surface of the movable plate 31 facing the Z direction side, and a part of the drawing laser light beam 3 emitted to the reflection film is reflected by the reflection surface 5a which is a surface of the reflection film 32. A reflector 33 is configured with the movable plate 31 and the reflection film 32.

A length of the displacement portion 25 in a direction along the vertical axis 12 is greater than a length thereof in a direction along the horizontal axis 11. That is, when a length of the displacement portion 25 in a direction along the vertical axis 12 is set as a and a length of the displacement portion 25 in a direction along the horizontal axis 11 is set as b, a relationship of a>b is satisfied. Accordingly, it is possible to suppress a length of the optical scanner 5 in a direction along the horizontal axis 11, while securing a length desired for the first shaft portion 29 and the second shaft portion 30. It is possible to easily respond to the oscillation of the displacement portion 25 using the horizontal axis 11 as a rotation axis with respect to a low frequency, and to easily respond to the oscillation of the displacement portion 25 using the vertical axis 12 as a rotation axis with respect to a high frequency.

The supporting portion 22, the third shaft portion 23, the fourth shaft portion 24, the plate-shaped member 26, the first shaft portion 29, the second shaft portion 30, and the movable plate 31 are integrally formed on a first Si layer (device layer). The portions described above and the magnetic supporting portion 27 are formed by etching an SOI substrate obtained by laminating the first Si layer (device layer), an oxide film 21a (box layer), and a second Si layer (handle layer) in this order. The magnetic supporting portion 27 and the support connection portion 21 are formed from the second Si layer. Fine processing can be performed on the SOI substrate by etching. Since the supporting portion 22, the third shaft portion 23, the fourth shaft portion 24, the plate-shaped member 26, the first shaft portion 29, the second shaft portion 30, the movable plate 31, the magnetic supporting portion 27, and the support connection portion 21 are formed by using the SOI substrate, it is possible to obtain excellent dimensional accuracy of these portions. Accordingly, it is possible to obtain excellent vibration properties of the first vibration system and the second vibration system.

The support connection portion 21 is disposed on the supporting portion 22 on the coil 15 side. The support connection portion 21 increases strength of the supporting portion 22. In addition, the support connection portion 21 surrounds the magnetic supporting portion 27 in the X and Y directions. Accordingly, it is possible to prevent stress from being applied to the third shaft portion 23 and the fourth shaft portion 24 when an operator grasps the structure 18. The support connection portion 21 is formed of silicon and the oxide film 21a is formed on the surface of the support connection portion 21 on the supporting portion 22 side.

The permanent magnet 28 is bonded to the negative Z direction side of the displacement portion 25 through the magnetic supporting portion 27. A bonding method of the displacement portion 25, the magnetic supporting portion 27, and the permanent magnet 28 is not particularly limited, but a bonding method using an adhesive can be used, for example. The permanent magnet 28 is disposed to be symmetrical with an intersection of the vertical axis 12 and the horizontal axis 11 as a center, in a plan view seen from the Z direction side.

The permanent magnet 28 has a bar shape which extends in a direction to be inclined with respect to both axes of the horizontal axis 11 and the vertical axis 12. The permanent magnet 28 is magnetized in a longitudinal direction thereof. The permanent magnet 28 in the positive X direction and the positive Y direction is magnetized to the N pole and the permanent magnet 28 in the negative X direction and the negative Y direction is magnetized to the S pole. The permanent magnet 28 is magnetized in a direction in which a line segment which connects the N pole and the S pole to each other is inclined with respect to the horizontal axis 11 and the vertical axis 12 in a plan view.

An inclined angle θ of the magnetization direction (extension direction) of the permanent magnet 28 with respect to the horizontal axis 11 is not particularly limited, and is preferably from 30° to 60° C., more preferably from 45° to 60°, and even more preferably 45°. By providing the permanent magnet 28 as described above, it is possible to smoothly and reliably oscillate the movable plate 31 around two axes of the horizontal axis 11 and the vertical axis 12.

As such a permanent magnet 28, a neodymium magnet, a ferrite magnet, a samarium cobalt magnet, an alnico magnet, a bonded magnet, or the like can be used, for example. The permanent magnet 28 is magnetized with a hard magnetic substance and is formed by being magnetized after installing a hard magnetic substance which is not yet magnetized on the displacement portion 25, for example. This is because the permanent magnet 28 may not be installed in a desired position due to effects of magnetic fields of the outside or other components, if the permanent magnet 28 which is already magnetized is attempted to be installed on the displacement portion 25.

The coil 15 is provided directly below the permanent magnet 28. Accordingly, the magnetic field generated from the coil 15 can efficiently operate on the permanent magnet 28. Therefore, it is possible to implement the power-saving and miniaturized optical scanner 5. The coil 15 is provided to be wound around the core 14. Accordingly, the magnetic field generated from the coil 15 can efficiently operate on the permanent magnet 28. When the magnetic field output by the coil 15 is sufficient, the core 14 may be omitted.

The coil 15 is electrically connected to the voltage applying unit 16. By applying a voltage to the coil 15 by the voltage applying unit 16, a magnetic field having a magnetic flux orthogonal to the horizontal axis 11 and the vertical axis 12 is generated from the coil 15.

The dimension of each member is not particularly limited, but in the embodiment, a dimension of each portion is set to the following values, for example. A length of the optical scanner 5 in the X direction is 3850 μm and a length thereof in the Y direction is 3990 μm. A length of the optical scanner 5 in the Z direction is from 4490 μm to 4590 μm. A height of the housing 13 is from 4200 μm to 4300 μm, and a height of the support connection portion 21 is 250 μm. A width of the side plate 13b, the support connection portion 21, and the supporting portion 22 is 500 μm. Accordingly, a length of a hole inside of the supporting portion 22 in the X direction is 2850 μm and a length thereof in the Y direction is 2990 μm.

A length of the plate-shaped member 26 in the X direction is 1700 μm, and a length thereof in the Y direction is 2890 μm. A thickness of the plate-shaped member 26 is 65 μm. A length of the first hole 25c and the second hole 25d in the Y direction is 1590 μm, and a length from an edge of the first hole 25c in the X direction to an edge of the second hole 25d in the negative X direction is 1100 μm. A length from an edge of the first hole 25c and the second hole 25d of the magnetic supporting portion 27 in the Y direction to the magnetic supporting portion 27 in the Y direction is 65 μm. A width of the magnetic supporting portion 27 in the Y direction is 150 μm. A length from an edge of the magnetic supporting portion 27 in the Y direction to an edge of the displacement portion 25 in the Y direction is 435 μm. Accordingly, a length from an edge of the first hole 25c and the second hole 25d in the Y direction to an edge of the plate-shaped member 26 in the Y direction is 650 μm. A length between the supporting portion 22 and the plate-shaped member 26 in the Y direction is 50 μm. A thickness of the magnetic supporting portion 27 is from 80 μm to 150 μm, and a length of the magnetic supporting portion 27 in the Z direction is 250 μm.

A diameter of the movable plate 31 is 1000 μm. A width of the permanent magnet 28 is from 500 μm to 800 μm and a length thereof is 1000 μm. A length of the permanent magnet 28 in the Z direction is from 200 μm to 300 μm. A length of the core 14 and the coil 15 in the Z direction is 3700 μm.

Figure 4A:
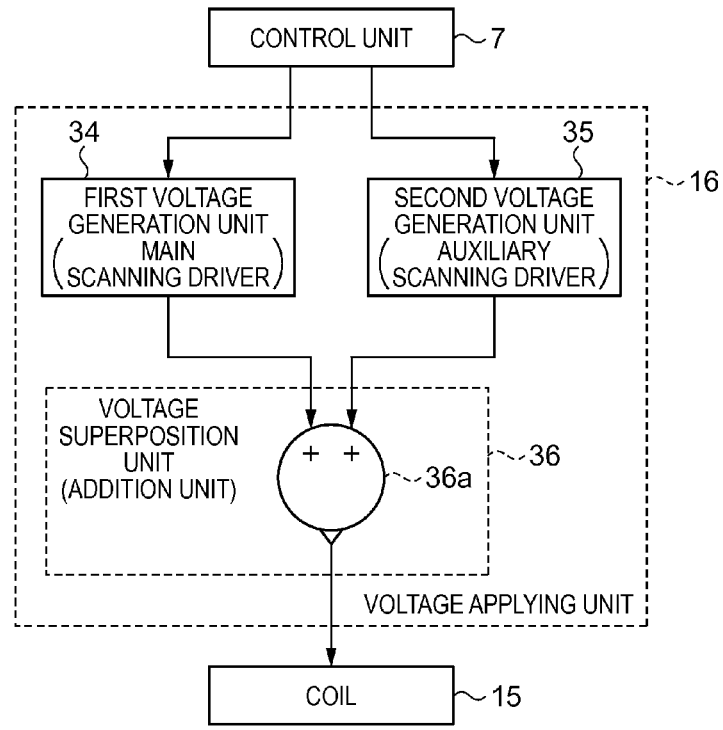
FIG. 4A is an electrical block diagram showing a configuration of a voltage applying unit.

FIG. 4A is an electrical block diagram showing a configuration of the voltage applying unit. As shown in FIG. 4A, the voltage applying unit 16 includes a first voltage generation unit 34 which generates a first voltage waveform for oscillating the movable plate 31 by using the vertical axis 12 as a rotation axis. The voltage applying unit 16 further includes a second voltage generation unit 35 which generates a second voltage waveform for oscillating the displacement portion 25 by using the horizontal axis 11 as a rotation axis. The voltage applying unit 16 includes a voltage superposition unit 36 which superposes the first voltage waveform and the second voltage waveform, and the voltage superposition unit 36 outputs superposed voltage to the coil 15.

Figure 4B:
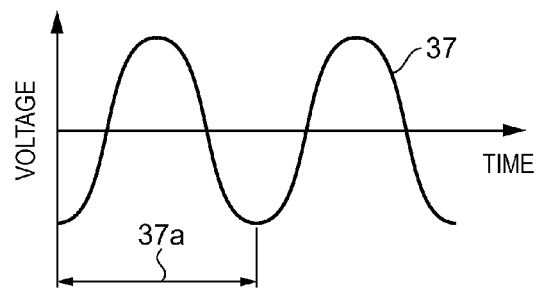
FIG. 4B is a diagram illustrating a first voltage waveform.

FIG. 4B is a diagram illustrating the first voltage waveform. In FIG. 4B, a vertical axis indicates a voltage and a horizontal axis indicates elapsed time. A first voltage waveform 37 indicates a waveform of a voltage output by the first voltage generation unit 34. The first voltage waveform 37 forms a waveform such as a sine wave which periodically changes in a period 37a. A frequency of the first voltage waveform 37 is, for example, preferably from 10 kHz to 40 kHz. In the embodiment, the frequency of the first voltage waveform 37 is, for example, set to be equivalent to a torsional resonance frequency (f1) of the first vibration system configured with the movable plate 31, the first shaft portion 29, and the second shaft portion 30. Accordingly, it is possible to increase an oscillation angle of the movable plate by using the vertical axis 12 as a rotation axis. Alternatively, it is possible to suppress power used for oscillating the movable plate 31.

Figure 4C:
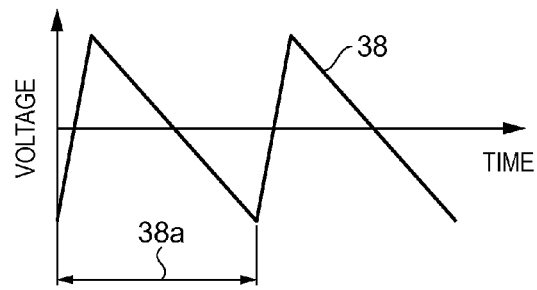
FIG. 4C is a diagram illustrating a second voltage waveform.

FIG. 4C is a diagram illustrating the second voltage waveform. In FIG. 4C, a vertical axis indicates a voltage and a horizontal axis indicates elapsed time. A second voltage waveform 38 indicates a waveform of a voltage output by the second voltage generation unit 35. The second voltage waveform 38 forms a waveform such as a saw-tooth wave which periodically changes in a period 38a which is longer than the period 37a. A frequency of the second voltage waveform 38 is lower than the frequency of the first voltage waveform. 37, and is, for example, preferably from 30 Hz to 120 Hz (approximately 60 Hz). In the embodiment, the frequency of the second voltage waveform 38 is adjusted so as to be a frequency different from a torsional resonance frequency (f2) of the second vibration system configured with the movable plate 31, the first shaft portion 29, the second shaft portion 30, the displacement portion 25, the third shaft portion 23, the fourth shaft portion 24, and the permanent magnet 28. The frequency of the second voltage waveform 38 is set to be smaller than the frequency of the first voltage waveform 37. Accordingly, it is possible to oscillate the movable plate 31 at the frequency of the first voltage waveform 37 by using the vertical axis 12 as a rotation axis and to oscillate the displacement portion 25 at the frequency of the second voltage waveform 38 by using the horizontal axis 11 as a rotation axis, in a more reliable and smooth manner.

When the torsional resonance frequency of the first vibration system is set as f1 (Hz) and the torsional resonance frequency of the second vibration system is set as f2 (Hz), it is preferable that f1 and f2 satisfy a relationship of f2<f1. Accordingly, it is possible to oscillate the movable plate 31 at the frequency of the first voltage waveform 37 by using the vertical axis 12 as a rotation axis and to oscillate the displacement portion 25 at the frequency of the second voltage waveform 38 by using the horizontal axis 11 as a rotation axis, in a smooth manner.

Returning to FIG. 4A, the first voltage generation unit 34 and the second voltage generation unit 35 are connected to the control unit 7, and are driven based on a signal from the control unit 7. The voltage superposition unit 36 is connected to the first voltage generation unit 34 and the second voltage generation unit 35. The voltage superposition unit 36 includes an adder 36a for applying a voltage to the coil 15. The adder 36a receives the first voltage waveform. 37 from the first voltage generation unit 34 and receives the second voltage waveform 38 from the second voltage generation unit 35. The adder 36a superposes voltage waveforms of the first voltage waveform 37 and the second voltage waveform 38 onto each other and outputs the superposed voltage waveform to the coil 15.

Next, the driving method of the optical scanner 5 will be described. The frequency of the first voltage waveform 37 is set to be equivalent to the torsional resonance frequency of the first vibration system. The frequency of the second voltage waveform 38 is set to be different from the torsional resonance frequency of the second vibration system, and is set to be lower than the frequency of the first voltage waveform 37. For example, the frequency of the first voltage waveform 37 is set to 18 kHz and the frequency of the second voltage waveform 38 is set to 60 Hz.

The voltage superposition unit 36 superposes the first voltage waveform 37 and the second voltage waveform 38 onto each other and outputs the superposed voltage waveform to the coil 15. When the voltage is applied to the coil 15, a magnetic field is generated so that one end (N pole) of the permanent magnet 28 is attracted to the coil 15 and the other end (S pole) of the permanent magnet 28 is repelled from the coil 15. The magnetic field at that time is set as a "first magnetic field". When a voltage reverse to the voltage in the first magnetic field is applied to the coil 15, a magnetic field is generated so that one end (N pole) of the permanent magnet 28 is repelled from the coil 15 and the other end (S pole) of the permanent magnet 28 is attracted to the coil 15. The magnetic field at that time is set as a "second magnetic field". When the voltage shown by the first voltage waveform 37 is applied to the coil 15, the magnetic field generated on the coil 15 is alternately changed over between the first magnetic field and the second magnetic field.

The permanent magnet 28 is oscillated as the magnetic field generated on the coil 15 is alternately changed over between the first magnetic field and the second magnetic field as described above. Vibration having a torsional vibration component using the vertical axis 12 as a rotation axis is excited on the displacement portion 25. The first shaft portion 29 and the second shaft portion 30 are twisted and deformed with this vibration, and the movable plate 31 oscillates at the frequency of the first voltage waveform 37 by using the vertical axis 12 as a rotation axis. Since the frequency of the first voltage waveform 37 is equivalent to the frequency of the torsional resonance frequency of the first vibration system, the coil 15 can cause the movable plate 31 to greatly oscillate by the resonance vibration.

Meanwhile, by the second voltage waveform 38, a magnetic field is generated so that one end (N pole) of the permanent magnet 28 is attracted to the coil 15 and the other end (S pole) of the permanent magnet 28 is repelled from the coil 15. The magnetic field at that time is set as a "third magnetic field". When a voltage reverse to the voltage in the third magnetic field is applied to the coil 15, a magnetic field is generated so that one end (N pole) of the permanent magnet 28 is repelled from the coil 15 and the other end (S pole) of the permanent magnet 28 is attracted to the coil 15. The magnetic field at that time is set as a "fourth magnetic field". When the voltage shown by the second voltage waveform 38 is applied to the coil 15, the magnetic field generated on the coil 15 is alternately changed over between the third magnetic field and the fourth magnetic field.

As the third magnetic field and the fourth magnetic field are alternately changed over as described above, the third shaft portion 23 and the fourth shaft portion 24 are twisted and deformed, and the displacement portion 25 and the movable plate 31 oscillate at the frequency of the second voltage waveform 38 by using the horizontal axis 11 as a rotation axis. The frequency of the second voltage waveform 38 is set to be extremely lower than the frequency of the first voltage waveform 37. The torsional resonance frequency of the second vibration system is set to be even lower than the torsional resonance frequency of the first vibration system. Accordingly, the oscillation of the movable plate 31 at the frequency of the second voltage waveform 38 by using the vertical axis 12 as a rotation axis is suppressed.

In the optical scanner 5, the voltage obtained by superposing the first voltage waveform 37 and the second voltage waveform 38 onto each other is output to the coil 15. Accordingly, the movable plate 31 is oscillated at the frequency of the first voltage waveform 37 around the vertical axis 12, and the movable plate is oscillated at the frequency of the second voltage waveform 38 around the horizontal axis 11. The movable plate 31 is oscillated around two axes which are the horizontal axis 11 and the vertical axis 12, and accordingly the drawing laser light 3 reflected by the reflection film 32 is two-dimensionally scanned. In addition, since the coil 15 is separated from the structure 18 of the optical scanner 5, it is possible to prevent a negative effect of heat generation of the coil 15 on the structure 18.

The control unit 7 has a function of controlling the operations of the drawing light source unit 4 and the optical scanner 5. In detail, the control unit 7 drives the optical scanner 5 so as to cause the movable plate 31 to oscillate by using the horizontal axis 11 and the vertical axis 12 as rotation axes. In addition, the control unit 7 synchronizes the drawing light source unit 4 with the oscillation of the movable plate 31, and causes emission of the drawing laser light 3 from the drawing light source unit 4. The control unit 7 includes an interface (not shown), and the control unit 7 inputs image data transmitted from an external computer through the interface. The control unit 7 causes emission of the laser light beams 3r, 3g, and 3b with a predetermined intensity from the laser light sources 8r, 8g, and 8b at a predetermined timing based on the image data. Accordingly, the optical scanner 5 emits the drawing laser light 3 with a predetermined color and light intensity at a predetermined timing. Thus, an image corresponding to the image data is displayed on the screen 2.

Figure 5A:
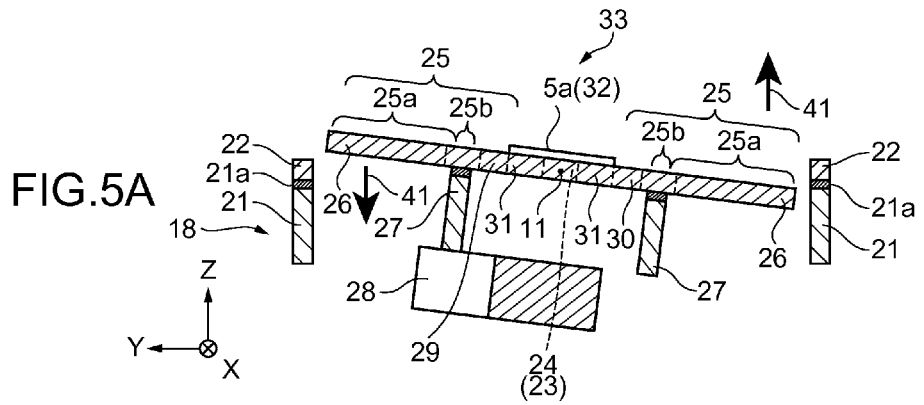
FIGS. 5A to 5C are schematic views illustrating operations of a displacement portion.
Figure 5B:
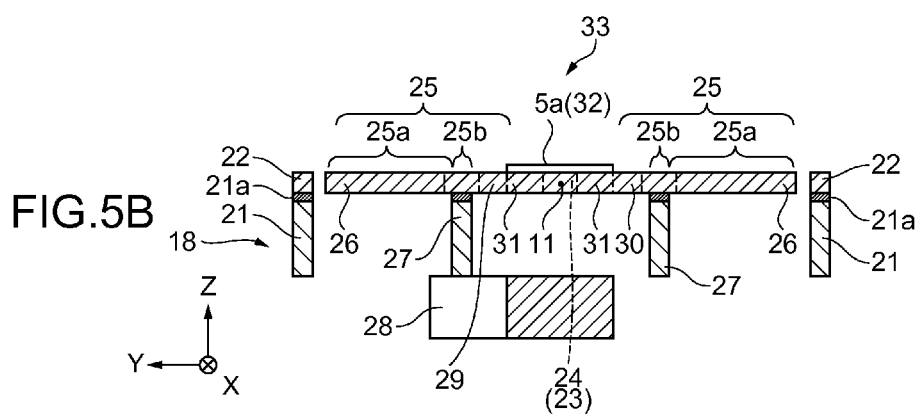
Figure 5C:
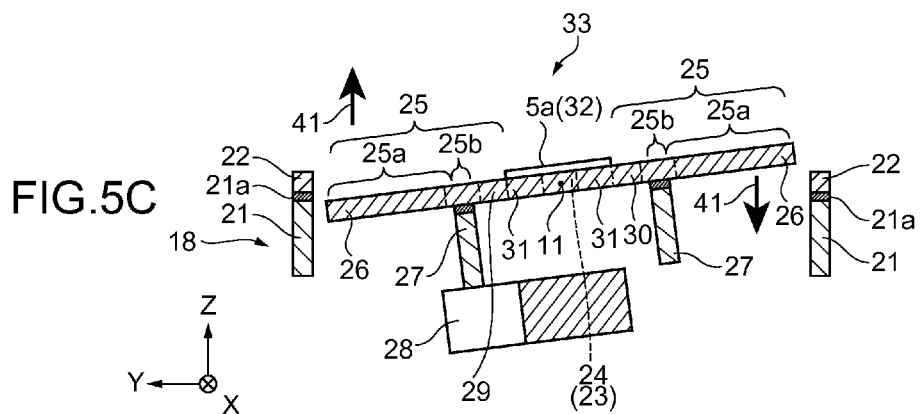

FIGS. 5A to 5C are schematic views illustrating operations of the displacement portion. FIG. 5A is a diagram when the displacement portion 25 is rotated clockwise by using the horizontal axis 11 as a rotation axis. FIG. 5B is a diagram when the displacement portion 25 is horizontal. FIG. 5C is a diagram when the displacement portion 25 is rotated counterclockwise by using the horizontal axis 11 as a rotation axis.

When the voltage applying unit 16 is electrically connected to the coil 15 and drives the permanent magnet 28, the displacement portion 25 is affected by the second voltage waveform 38. The displacement portion 25 oscillates by using the third shaft portion 23 and the fourth shaft portion 24 as rotation axes in the order of FIG. 5A, FIG. 5B, FIG. 5C, FIG. 5B, and FIG. 5A.

One end of each of the first shaft portion 29 and the second shaft portion 30 supports the movable plate 31 and the other end of each of the first shaft portion 29 and the second shaft portion 30 is connected to the displacement portion 25. The displacement portion 25 is supported by the third shaft portion 23 and the fourth shaft portion 24. A direction in which the first shaft portion 29 and the second shaft portion 30 extend, and a direction in which the third shaft portion 23 and the fourth shaft portion 24 extend are orthogonal to each other. The movable plate 31 oscillates around the vertical axis 12, and the displacement portion 25 oscillates around the horizontal axis 11. Accordingly, the movable plate 31 oscillates around axes in two directions orthogonal to each other.

The permanent magnet 28 is fixed to the displacement portion 25. The coil 15 which generates the magnetic field on the permanent magnet 28 to drive the displacement portion 25 is installed. By driving the displacement portion 25 with the electrical connection of the coil 15, the optical scanner 5 can cause the movable plate 31 including the reflection surface 5a to oscillate around axes in two directions intersecting with each other.

The displacement portion 25 includes the thick frame portion 25b and the first thin plate structure portion 25a. The frame portion 25b is positioned to be close to the third shaft portion 23 and the fourth shaft portion 24 and the first thin plate structure portion 25a is positioned at a location separated from the third shaft portion 23 and the fourth shaft portion 24. Accordingly, the inertia moment of the displacement portion 25 of the optical scanner 5 is decreased, compared to when the thickness of the first thin plate structure portion 25a is the same as the thickness of the frame portion 25b. As the inertia moment of the displacement portion 25 decreases, the power consumed for driving the displacement portion 25 can be reduced. Accordingly, it is possible to reduce the power consumed for driving the optical scanner 5.

When the displacement portion 25 oscillates around the axes of the third shaft portion 23 and the fourth shaft portion 24, an air current 41 is generated around the frame portion 25b and the first thin plate structure portion 25a. The first thin plate structure portion 25a functions as a damper which attenuates the rotation rate due to the air current 41. Accordingly, it is possible to set the displacement portion 25 to resist reacting with respect to the driving of the first voltage waveform 37 having a high frequency. Thus, when the displacement portion 25 oscillates around the third shaft portion 23 and the fourth shaft portion 24, it is possible to set the displacement portion 25 to be hardly affected by the driving of the first voltage waveform 37 having a high frequency. As a result, it is possible to improve the vibration performance of the movable plate 31. That is, the displacement portion 25 can oscillate by using the vertical axis 12 as an axis in accordance with the first voltage waveform 37, and the displacement portion 25 can oscillate by using the horizontal axis 11 as an axis in accordance with the second voltage waveform 38. When the displacement portion 25 oscillates around the horizontal axis 11, the displacement portion 25 can be oscillated so as not to be affected by the first voltage waveform 37.

Figure 6A:
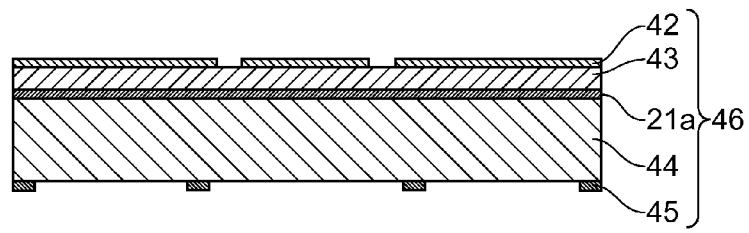
FIGS. 6A to 6D are schematic views illustrating a manufacturing method of an optical scanner.

FIGS. 6A to 7C are schematic views illustrating a manufacturing method of the optical scanner. Next, the manufacturing method of the optical scanner 5 will be described with reference to FIGS. 6A to 7C. First, the structure 18 is manufactured. As shown in FIG. 6A, a laminated substrate 46 in which a resist layer 42, a first silicon layer 43, the oxide film 21a, a second silicon layer 44, and a mask oxide film 45 from the top of the drawing are laminated on each other is prepared. The oxide film 21a and the mask oxide film 45 are layers formed of silicon dioxide. A thickness of each layer is not particularly limited, but in the embodiment, for example, a thickness of the first silicon layer 43 is set to be approximately 40 μm, a thickness of the oxide film 21a is set to be approximately 0.5 μm, a thickness of the second silicon layer 44 is set to be approximately 250 μm, and a thickness of the mask oxide film 45 is set to be approximately 0.5 μm.

Next, the resist layer 42 and the mask oxide film 45 are patterned. The resist layer 42 is patterned in the shape of the movable plate 31, the first shaft portion 29, the second shaft portion 30, the plate-shaped member 26, the third shaft portion 23, the fourth shaft portion 24, and the supporting portion 22. The mask oxide film 45 is patterned to the shape of the support connection portion 21 and the magnetic supporting portion 27.

Figure 6B:
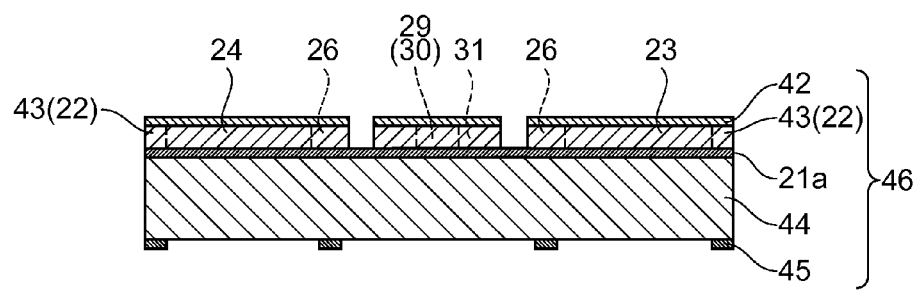

Next, as shown in FIG. 6B, the first silicon layer 43 is subjected to dry etching by using the resist layer 42 as a mask. The movable plate 31, the first shaft portion 29, the second shaft portion 30, the plate-shaped member 26, the third shaft portion 23, the fourth shaft portion 24, and the supporting portion 22 are formed by this etching.

Figure 6C:
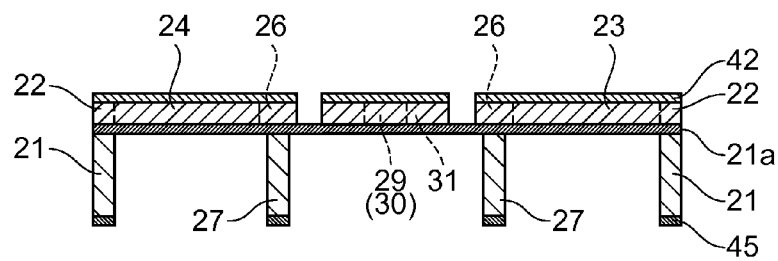
Figure 6D:
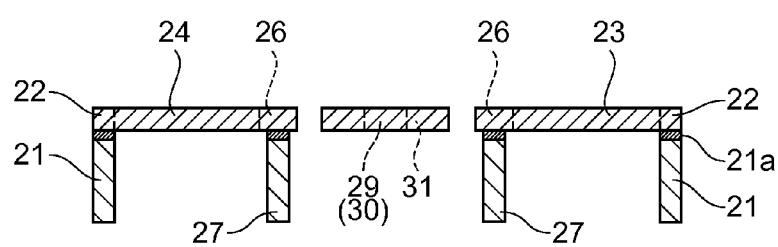

Next, as shown in FIG. 6C, the second silicon layer 44 is subjected to etching by an etching method such as dry etching, for example. At that time, the mask oxide film 45 is used as a mask. The support connection portion 21 and the magnetic supporting portion 27 are formed. Next, as shown in FIG. 6D, an exposed part of the oxide film 21a and the mask oxide film 45 are etched and removed. In addition, the resist layer 42 is peeled off and removed.

Figure 7A:
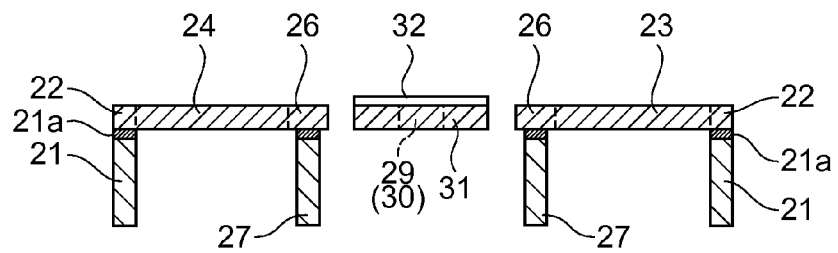
FIGS. 7A to 7C are schematic views illustrating a manufacturing method of an optical scanner.

Next, as shown in FIG. 7A, the reflection film 32 is formed on the movable plate 31. The material of the reflection film 32 is formed by a method such as vapor deposition and sputtering. The movable plate 31 may be polished to set a mirror surface, before forming the reflection film 32. Accordingly, the drawing laser light 3 can be reflected at an angle with excellent precision. A step of polishing the movable plate 31 to set a mirror surface is not particularly limited, and it is preferable to perform the step before installing the resist layer 42. It is possible to polish the movable plate 31 without damaging the first shaft portion 29 and the second shaft portion 30.

Figure 7B:
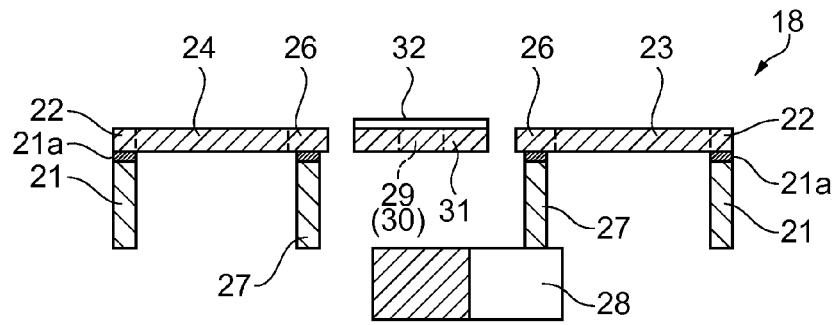

Next, as shown in FIG. 7B, the permanent magnet 28 is adhered and fixed to the magnetic supporting portion 27. When forming a plurality of structures 18 on one silicon wafer, the structures 18 are cut by a method such as dicing. As described above, the structure 18 of the optical scanner 5 is obtained.

Figure 7C:
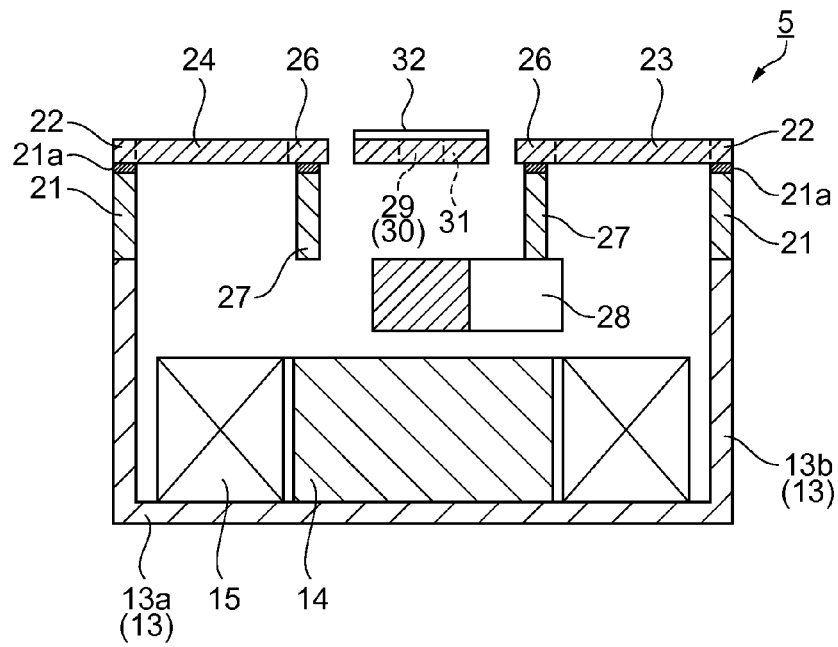

Next, as shown in FIG. 7C, the housing 13 in which the core 14 and the coil 15 are installed on the bottom plate 13a is prepared. The core 14 and the coil 15 can be adhered to the housing 13 by using an adhesive material. Next, the housing 13 and the support connection portion 21 are adhered to be overlapped with each other. As described above, the optical scanner 5 is completed.

As described above, according to the embodiment, the following effects are obtained.

(1) According to the embodiment, the displacement portion 25 includes the frame portion 25b and the first thin plate structure portion 25a. The frame portion 25b maintains a relative position of the first shaft portion 29 and the second shaft portion 30, and the third shaft portion 23 and the fourth shaft portion 24. The first thin plate structure portion 25a extends in a direction orthogonal to the direction in which the third shaft portion 23 and the fourth shaft portion 24 extend. When the displacement portion 25 oscillates around the horizontal axis 11, the first thin plate structure portion 25a functions as a damper by generating the air current 41 around the first thin plate structure portion. Accordingly, it is possible to set the displacement portion 25 to resist reacting with respect to the high frequency driving. Thus, when the displacement portion 25 oscillates around the horizontal axis 11, it is possible to set the displacement portion to resist reacting with respect to the high frequency driving. As a result, it is possible to improve the vibration performance of the reflection surface 5a.

(2) According to the embodiment, the displacement portion 25 includes a second thin plate structure portion 26a continued from the frame portion 25b. Since a thickness of the second thin plate structure portion 26a is smaller than that of the frame portion 25b, the second thin plate structure portion is more easily deformed than the frame portion 25b. The third shaft portion 23 and the fourth shaft portion 24 are connected to the second thin plate structure portion 26a in the connection portion 26b. Accordingly, the displacement portion 25, the third shaft portion 23, and the fourth shaft portion 24 can cause the stress concentration to be hardly generated on the connection portion 26b when the third shaft portion 23 and the fourth shaft portion 24 are twisted, compared to when the third shaft portion 23 and the fourth shaft portion 24 are connected to the frame portion 25b. The connection portion 26b where the third shaft portion 23 and the fourth shaft portion 24 are connected to the second thin plate structure portion 26a has a circular arc shape. Accordingly, the displacement portion 25 can cause the stress concentration to be hardly generated on the connection portion 26b when the third shaft portion 23 and the fourth shaft portion 24 are twisted.

(3) According to the embodiment, the displacement portion 25 is configured with the frame portion 25b and the first thin plate structure portion 25a. The first thin plate structure portion 25a is formed of a thinner plate than the frame portion 25b. Accordingly, it is possible to reduce the inertia moment of the displacement portion 25, compared to when the entire displacement portion 25 is configured to have the thickness of the frame portion 25b. As a result, it is possible to oscillate the displacement portion 25 with low energy, and therefore it is possible to reduce the power consumed by the coil 15.

Second Embodiment

Figure 8A:
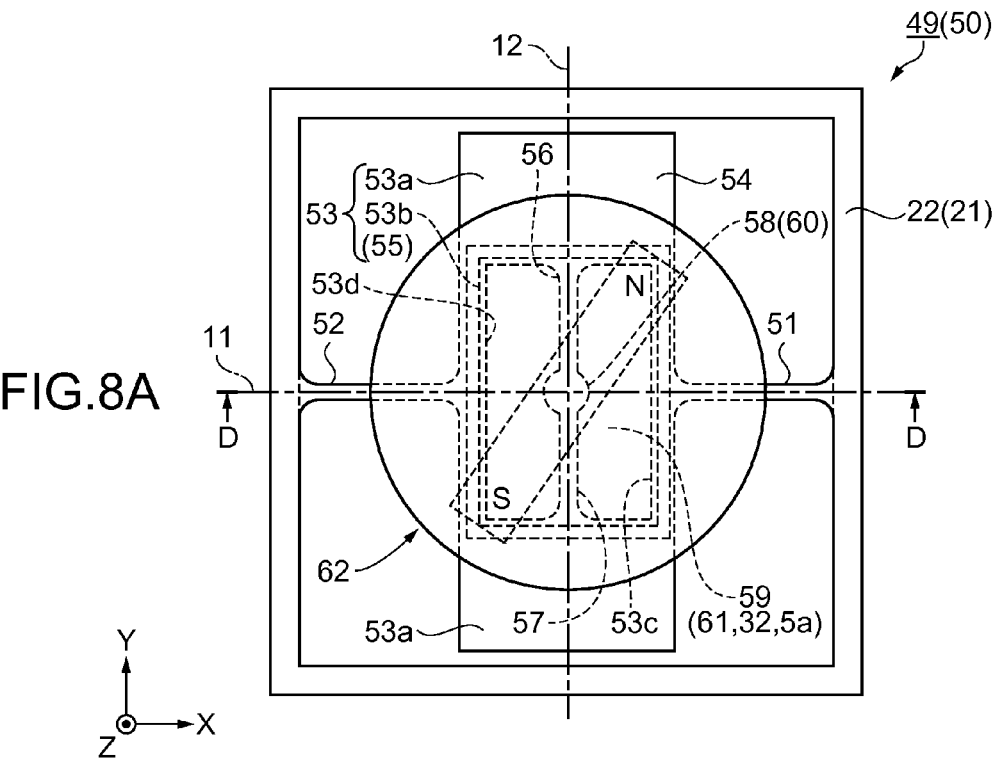
Figure 8B:
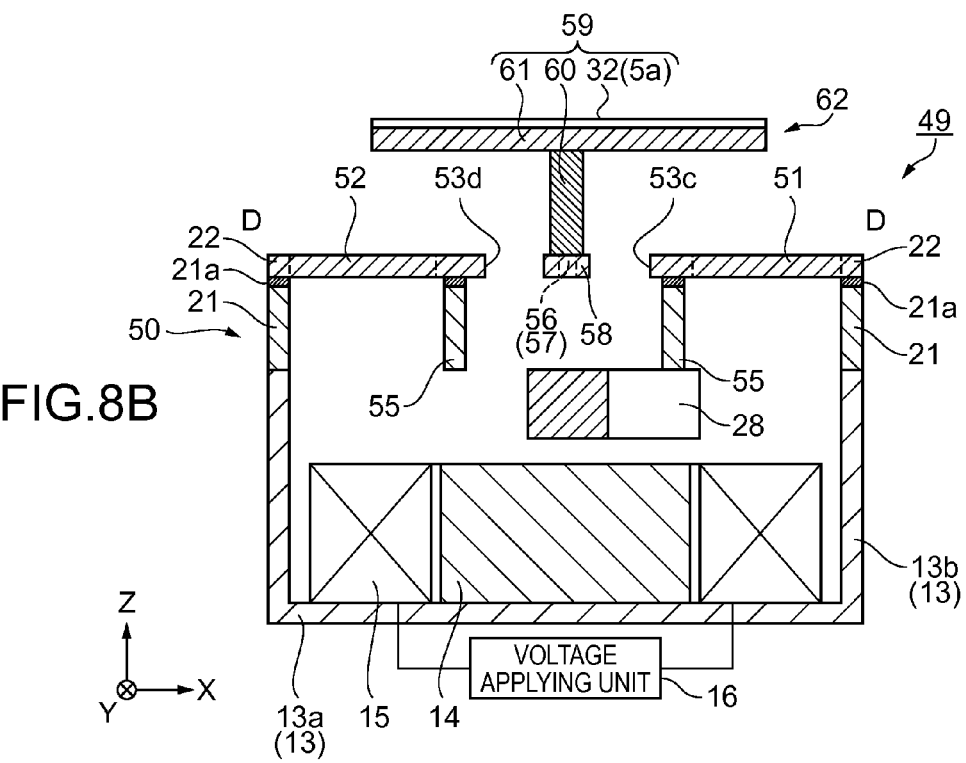

Next, one embodiment of an optical scanner will be described with reference to FIG. 8A showing a schematic plan view showing a structure of an optical scanner and FIG. 8B showing a schematic cross-sectional side view showing a structure of an optical scanner. A different point of the embodiment from the first embodiment is the shape of the reflector 33 shown in FIGS. 2A to 3B. The description of the same points as the first embodiment will be omitted.

That is, in the embodiment, as shown in FIGS. 8A and 8B, an optical scanner 49 includes the housing 13 in which the core 14 and the coil 15 are installed on the bottom plate 13a. A structure 50 is installed on the sideplate 13b of the housing 13. The structure 50 includes the support connection portion 21 connected to the side plate 13b, and the oxide film 21a is installed on a surface of the support connection portion 21 facing the Z direction side. The supporting portion 22 is installed on the Z direction side of the support connection portion 21.

A third shaft portion 51 and a fourth shaft portion 52 as a second torsion bar spring portion which extends in the X direction are installed at the center of the supporting portion 22 in the Y direction. A displacement portion 53 is installed between the third shaft portion 51 and the fourth shaft portion 52. The displacement portion 53 has a square frame shape and is a rectangle having long sides in the Y direction. A length of the displacement portion 53 in the X direction is smaller than the length of the displacement portion 25 of the first embodiment. A length of the displacement portion 53 in the Y direction is smaller than the length of the displacement portion 25 of the first embodiment.

The displacement portion 53 is configured with a plate-shaped member 54 and a magnetic supporting portion 55. A part of the displacement portion 53 positioned on the Y direction side of the magnetic supporting portion 55 is set as a first thin plate structure portion 53a. A part of the displacement portion 53 positioned on the negative Y direction side of the magnetic supporting portion 55 is also set as the first thin plate structure portion 53a. A part including the magnetic supporting portion 55 and positioned inside of the magnetic supporting portion 55 is set as a frame portion 53b. The frame portion 53b is configured with a part of the plate-shaped member 54 and the magnetic supporting portion 55. A thickness of the first thin plate structure portion 53a is smaller than a thickness of the frame portion 53b. The permanent magnet 28 is installed on the magnetic supporting portion 55 on the core 14 side.

A first shaft portion 56 and a second shaft portion 57 as the first torsion bar spring portion which extends in the Y direction are installed at the center of the displacement portion 53 in the X direction. A movable plate 58 is installed between the first shaft portion 56 and the second shaft portion 57. The movable plate 58 has a disc shape, and a size of the movable plate 58 is smaller than that of the movable plate 31 of the first embodiment. Accordingly, a length of the plate-shaped member 54 and the displacement portion 53 in the X direction can be set to be short.

A light reflection unit 59 is installed on the movable plate 58. The light reflection unit 59 includes a support 60 and a reflection plate 61. The support 60 is installed on the movable plate 58 and the reflection plate 61 is installed on the support 60. The reflection film 32 is installed on the surface of the reflection plate 61 on the Z direction side, and the surface of the reflection plate 61 on the Z direction side is set as the reflection surface 5a. The reflection plate 61 and the displacement portion 53 are installed at an interval in the Z direction. In a plan view seen from the Z direction side of the reflection plate 61, a part of the reflection plate 61 is disposed so as to be overlapped with the magnetic supporting portion 55.

A hole positioned on the X direction side of the first shaft portion 56 and the second shaft portion 57 in the displacement portion 53 is set as a first hole 53c, and a hole positioned on the negative X direction side of the first shaft portion 56 and the second shaft portion 57 is set as a second hole 53d. The plate-shaped member 54 surrounding the first hole 53c and the second hole 53d is a part of the displacement portion 53. In a plan view seen from the Z direction side, the reflection plate 61 protrudes in the X direction with respect to the first hole 53c and protrudes in the negative X direction with respect to the second hole 53d. That is, in a plan view seen from the Z direction side, a part of the reflection plate 61 is disposed so as to be overlapped with the displacement portion 53. A diameter of the reflection plate 61 is the same as that of movable plate 31 of the first embodiment. A reflector 62 is configured with the movable plate 58 and the light reflection unit 59.

When the length of the displacement portion 53 in the X direction is small, it is possible to obtain excellent responsiveness with respect to the driving at a high frequency in the oscillation around the vertical axis 12. Accordingly, the control unit 7 can cause the displacement portion 53 to oscillate with excellent responsiveness with respect to the driving at a high frequency around the vertical axis 12. Since the frequency of the first voltage waveform 37 coincides with a torsional resonance frequency of a first vibration system formed of the movable plate 58, the first shaft portion 56, the second shaft portion 57, and the light reflection unit 59, the movable plate 58 and the light reflection unit 59 can oscillate with the oscillation of the displacement portion 53 around the vertical axis 12.

A dimension of each member is not particularly limited, but in the embodiment, a dimension of each portion is set to the following values, for example. A length of the optical scanner 49 in the X direction is 3070 μm and a length thereof in the Y direction is 3240 μm. A length of the support connection portion 21 in the Z direction is 250 μm. A width of the supporting portion 22 is 500 μm. A length of the hole inside of the supporting portion 22 in the X direction is 2070 μm and a length thereof in the Y direction is 2240 μm.

A length of the displacement portion 53 in the X direction is 1000 μm and a length thereof in the Y direction is 2140 μm. A thickness of the plate-shaped member 54 in the Z direction is 40 μm. A length from an edge of the first hole 53c in the positive X direction to an edge of the second hole 53d in the negative X direction is 400 μm. A length of the first hole 53c and the second hole 53d in the Y direction is 840 μm. A length from an edge of the first hole 53c and the second hole 53d in the Y direction to the magnetic supporting portion 55 in the Y direction is 65 μm. A width of the magnetic supporting portion 55 in the Y direction is 150 μm. A length from an edge of the magnetic supporting portion 55 in the Y direction to an edge of the displacement portion 53 in the Y direction is 435 μm. Accordingly, a length from an edge of the first hole 53c and the second hole 53d in the Y direction to an edge of the plate-shaped member 54 in the Y direction is 650 μm.

A diameter of the support 60 is 270 μm. A diameter of the reflection plate 61 is 1000 μm and a thickness thereof is 40 μm. A length of the permanent magnet 28 is 1000 μm and a width thereof is from 500 μm to 800 μm.

As described above, according to the embodiment, the following effects are obtained.

(1) According to the embodiment, the reflection plate 61 and the displacement portion 53 are installed at an interval in the Z direction. In a plan view seen from the Z direction side of the reflection plate 61, a part of the reflection plate 61 is overlapped with the displacement portion 53. In this configuration, a length of the displacement portion 53 can be set to be small, compared to when the reflection plate 61 and the displacement portion 53 are positioned on the same plane. Accordingly, the displacement portion 53 can be set to be short, and therefore it is possible to obtain excellent responsiveness of the movable plate 58 and the light reflection unit 59 with respect to the driving at a high frequency.

Third Embodiment

Figure 9A:
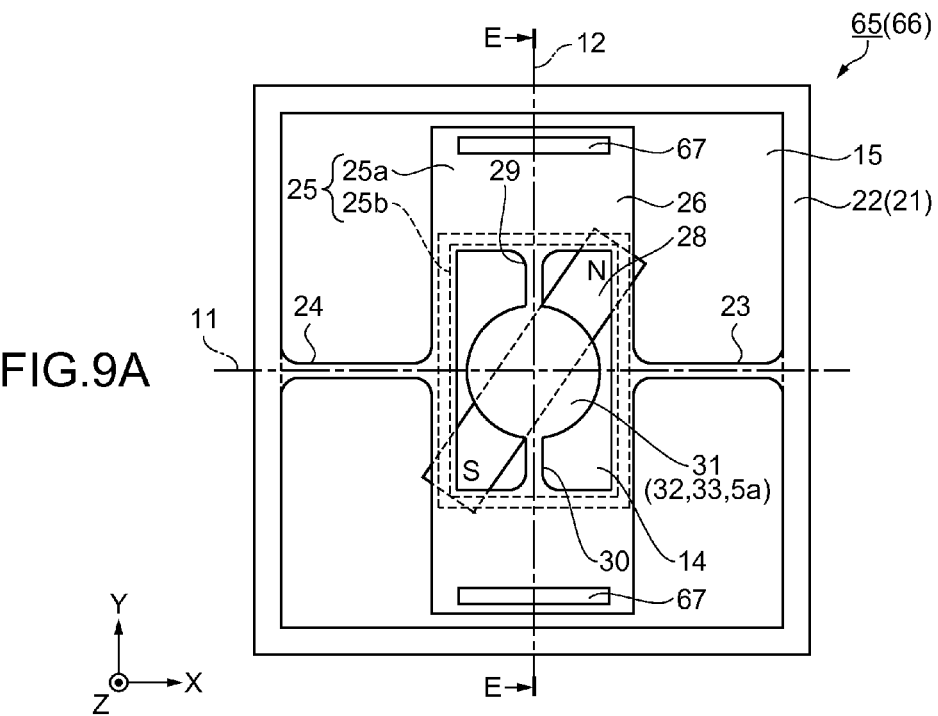
Figure 9B:
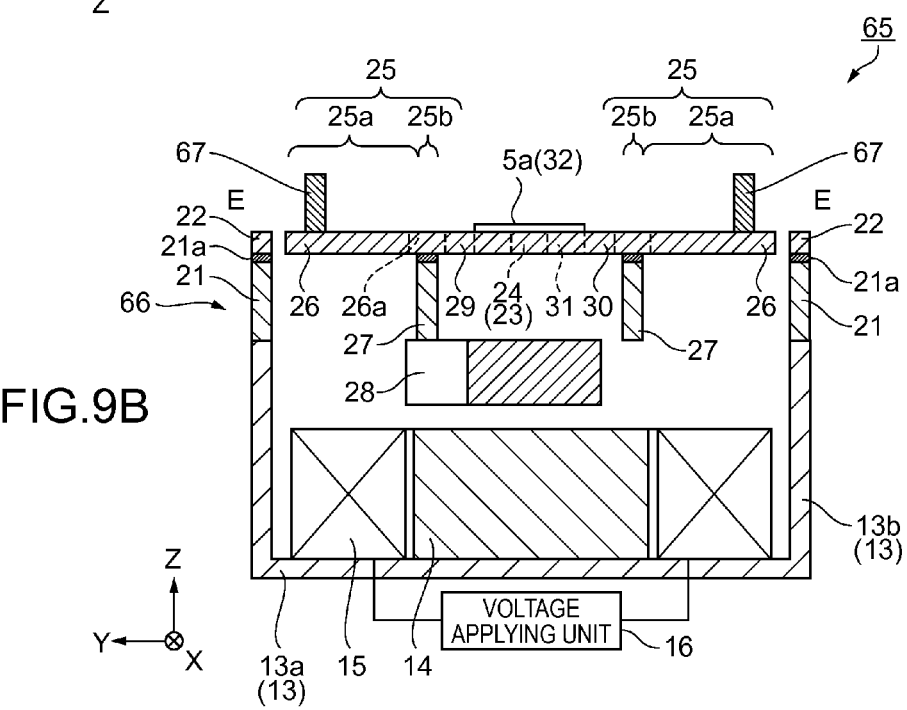

Next, one embodiment of an optical scanner will be described with reference to FIG. 9A showing a schematic plan view showing a structure of an optical scanner and FIG. 9B showing a schematic cross-sectional side view showing a structure of an optical scanner. A different point of the embodiment from the first embodiment is installation of weights on both ends of the displacement portion 25. The description of the same points as the first embodiment will be omitted.

That is, in the embodiment, as shown in FIGS. 9A and 9B, in a structure 66 of an optical scanner 65, weight portions 67 are installed on an end of the positive Y direction side and an end of the negative Y direction side of the first thin plate structure portion 25a. Since the thickness of the first thin plate structure portion 25a is obtained by adding a thickness of the weight portion 67 to the thickness of the plate-shaped member 26, the thickness of the first thin plate structure portion 25a at the position where the weight portion 67 is installed is increased. That is, the first thin plate structure portion 25a becomes thicker at the position separated from the third shaft portion 23 and the fourth shaft portion 24 than at the position close to the shaft portions.

It is possible to increase the inertia moment of the displacement portion 25 around the horizontal axis 11, compared to when the thickness of the first thin plate structure portion 25a at the position separated from the horizontal axis 11 is thin. Accordingly, it is possible to set the displacement portion 25 to resist reacting with respect to the high frequency driving. Thus, when the displacement portion 25 oscillates around the horizontal axis 11, it is possible to set the displacement portion to resist reacting with respect to the high frequency driving. As a result, it is possible to improve the vibration performance of the movable plate 31.

The location of the first thin plate structure portion 25a where the weight portion 67 is installed is disposed on the surface opposite the side where the permanent magnet 28 is installed in the displacement portion 25. That is, the weight portion 67 is installed on the Z direction side of the displacement portion 25.

Accordingly, a gravity center of the displacement portion 25 can be set to be close to the axis of the second torsion bar spring portion. Therefore, it is possible to reduce combined stress due to the torsion stress and bending stress applied to the second torsion bar spring portion, and to increase reliability with respect to the damage to the beams.

A dimension of the weight portion 67 is not particularly limited, but in the embodiment, the dimension of the weight portion 67 is set to the following value, for example. A length of the weight portion 67 in the Y direction is from 50 µm to 100 µm and a length thereof in the Z direction is from 200 µm to 300 µm.

Fourth Embodiment

Figure 10A:
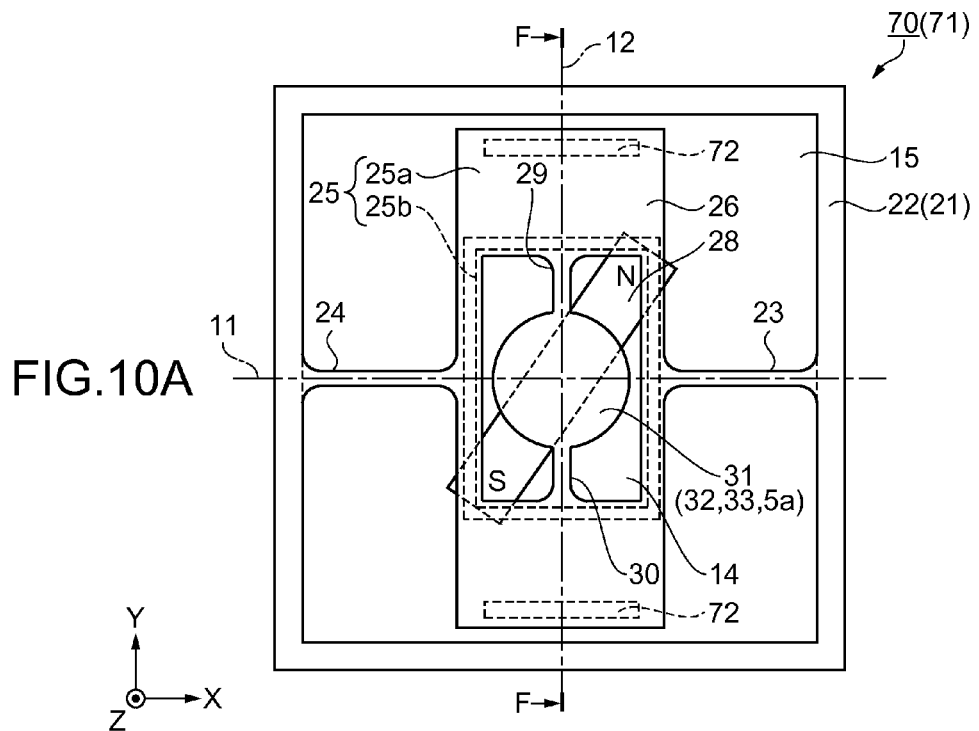
Figure 10B:
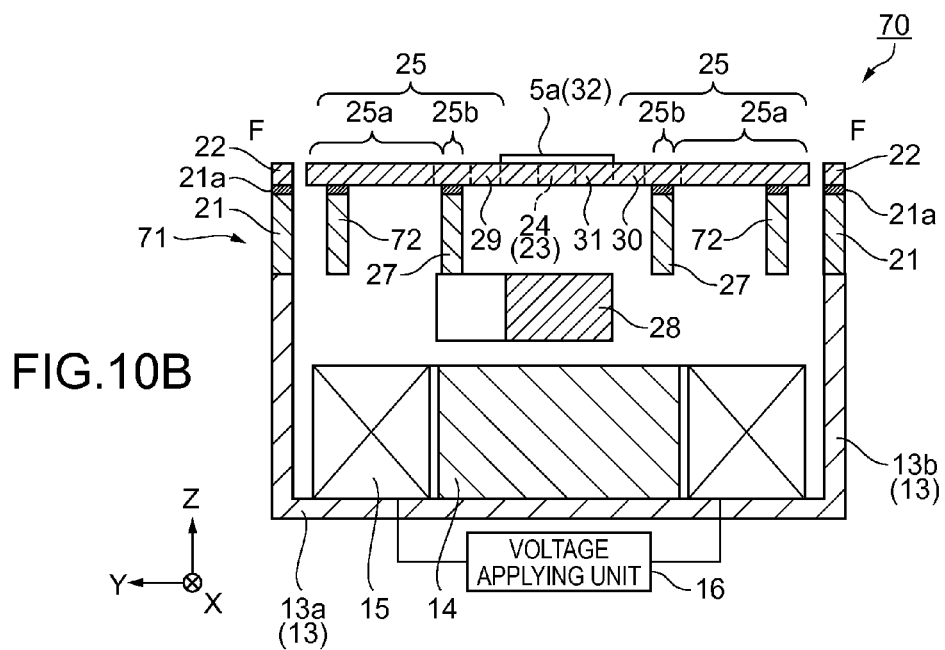

Next, one embodiment of an optical scanner will be described with reference to FIG. 10A showing a schematic plan view showing a structure of an optical scanner and FIG. 10B showing a schematic cross-sectional side view showing a structure of an optical scanner. The embodiment is different from the third embodiment in that the surface of the displacement portion 25 where the weight portion 67 is installed is different. The description of the same points as the third embodiment will be omitted.

That is, in the embodiment, as shown in FIGS. 10A and 10B, in a structure 71 of an optical scanner 70, weight portions 72 are installed on an end of the positive Y direction side and an end of the negative Y direction side of the first thin plate structure portion 25a. The location of the first thin plate structure portion 25a where the weight portion 72 is installed is disposed on the same surface as the side where the permanent magnet 28 is installed in the displacement portion 25. That is, the weight portion 72 is installed on the negative Z direction side of the displacement portion 25. Lengths of the support connection portion 21, the magnetic supporting portion 27, and the weight portion 72 in the Z direction are the same length, and the portions thereof have the same materials.

Accordingly, the support connection portion 21, the magnetic supporting portion 27, and the weight portion 72 are formed by etching in the same step. Thus, it is possible to have a structure which is easy to manufacture the optical scanner 70. A dimension of the weight portion 72 is not particularly limited, but in the embodiment, a length of the weight portion 72 in the Y direction is from 50 µm to 100 µm.

Fifth Embodiment

Next, one embodiment of a heads-up display using the optical scanner will be described with reference to FIG. 11. The image display device 1 of the first embodiment is used in the heads-up display of the embodiment. The description of the same points as the first embodiment will be omitted.

Figure 11:
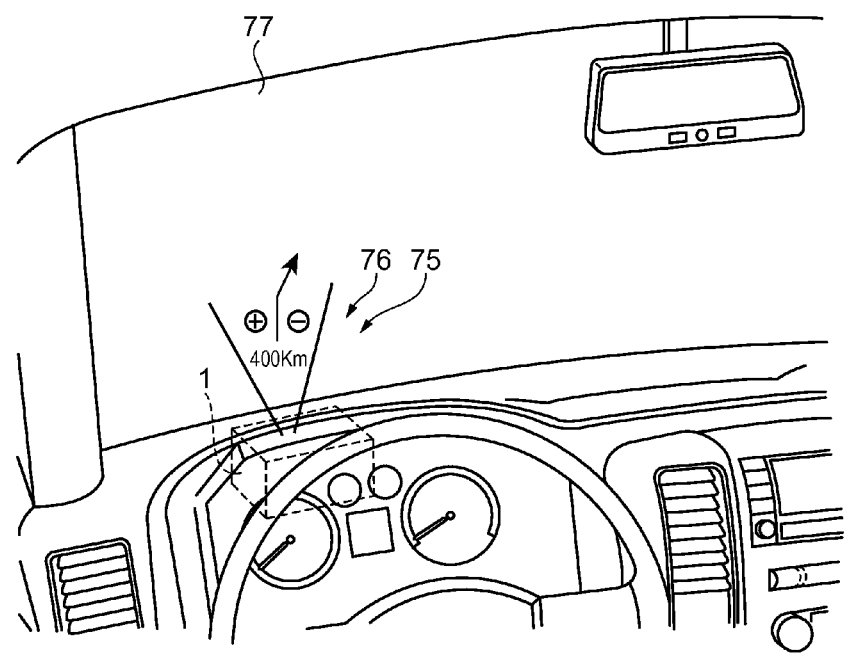
FIG. 11 is a schematic perspective view showing a heads-up display according to a fifth embodiment.

FIG. 11 is a schematic perspective view showing the heads-up display. As shown in FIG. 11, in a heads-up display system 75, the image display device 1 is mounted on a dashboard of a vehicle so as to configure a heads-up display 76. With this heads-up display 76, it is possible to display a predetermined image such as a display guiding to a destination, for example, on a windshield 77. The heads-up display system 75 is not limited to a vehicle, and an airplane or a ship can be used, for example.

In the optical scanner 5 installed in the image display device 1, the first thin plate structure portion 25a functions as a damper with the air current 41 generated around the first thin plate structure portion. Accordingly, it is possible to set the oscillation of the displacement portion 25 around the horizontal axis 11 to resist reacting with respect to the high frequency driving. Thus, when the reflection surface 5a oscillates around the horizontal axis 11, it is possible to set the reflection surface to resist reacting with respect to the high frequency driving. The heads-up display system 75 can include the optical scanner 5 having excellent vibration performance and an image which is easy to see for a viewer can be displayed.

Sixth Embodiment

Next, one embodiment of a head mount display using the optical scanner will be described with reference to FIG. 12. The image display device 1 of the first embodiment is used in the head mount display of the embodiment. The description of the same points as the first embodiment will be omitted.

Figure 12:
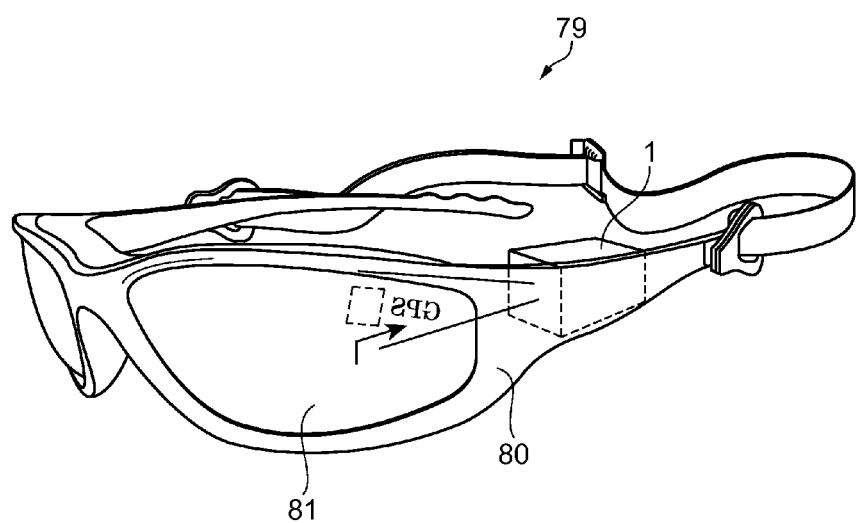
FIG. 12 is a schematic perspective view showing a head mount display according to a sixth embodiment.

FIG. 12 is a schematic perspective view showing a head mount display. As shown in FIG. 12, a head mount display 79 includes a frame 80 to be mounted on a head of a viewer, and the image display device 1 mounted on the frame 80. The image display device 1 displays a predetermined image to be recognized with one eye, on a display portion 81 provided at a portion of a lens of the frame 80. Alternatively, the drawing laser light 3 may be reflected by the display portion 81 so as to form a virtual image on a retina of a viewer.

The display portion 81 may be transparent or may be opaque. When the display portion 81 is transparent, a viewer can see the background which is seen through the display portion 81 and information from the image display device 1 in an overlapped manner. The display portion 81 may reflect at least a part of the incident light beam or a half mirror can be used as the display portion 81, for example. In addition, two image display devices 1 may be provided on the head mount display 79, and an image may be displayed on two display portions so that the image can be recognized with both eyes.

Hereinabove, the optical scanner 5, the image display device 1, the heads-up display 76, the head mount display 79, and the manufacturing method of the optical scanner 5 have been described, but the invention is not limited thereto, and configurations of the units can be substituted with arbitrary configurations having the same functions. In addition, other arbitrary configurations may be added to the invention. Modification examples are described as follows.

Modification Example 1

In the first embodiment, the movable plate 31 has a circular shape in a plan view seen from the Z direction side, but a planar shape of the movable plate 31 is not limited thereto and may be an ellipse, or a polygon such as a triangle or a square, for example. The embodiment may be set to be easily manufactured.

Modification Example 2

In the first embodiment, the direction in which the first shaft portion 29 and a second shaft portion 30 extend, and the direction in which the third shaft portion 23 and the fourth shaft portion 24 extend are orthogonal to each other. The direction in which the first shaft portion 29 and a second shaft portion 30 extend, and the direction in which the third shaft portion 23 and the fourth shaft portion 24 extend may intersect with each other diagonally. At that time, it is also possible to oscillate the reflection surface 5a to draw a two-dimensional image by using the drawing laser light 3.

Modification Example 3

In the third embodiment, the weight portions 67 are installed on the Z direction side of the displacement portion 25. In the fourth embodiment, the weight portions 72 are installed on the negative Z direction side of the displacement portion 25. The weight portions may be installed on both of the positive Z direction side and the negative Z direction side of the displacement portion 25. The position of the weight portions may be adjusted in accordance with the operation of the displacement portion 25.

In the optical scanner 49 of the second embodiment in which the light reflection unit 59 is installed, the weight portions 67 may be installed on the Z direction side of the displacement portion 53. In addition, in the optical scanner 49, the weight portions 72 may be installed on the negative Z direction side of the displacement portion 53. The weight portions may be installed on both of the positive Z direction side and the negative Z direction side of the displacement portion 53. The position of the weight portions may be adjusted in accordance with the operation of the displacement portion 53.

Modification Example 4

In the fifth embodiment and the sixth embodiment, the optical scanner 5 is used in the image display device 1.

Instead of the optical scanner 5, the optical scanner 49, the optical scanner 65, or the optical scanner 70 may be used. At that time, it is also possible to draw an image with excellent quality.

The entire disclosure of Japanese Patent Application No. 2013-223978 filed Oct. 29, 2013 is hereby expressly incorporated by reference herein.

What is claimed is:

1. An optical scanner comprising:
    a movable plate which includes a light reflection unit which reflects light;
    a first torsion bar spring which oscillatably supports the movable plate around a first axis;
    a displacement member which is connected to the first torsion bar spring;
    a second torsion bar spring which oscillatably supports the displacement member around a second axis intersecting with the first axis;
    a permanent magnet which is provided on the displacement member so that a line connecting first and second magnetic pole of the permanent magnet is inclined with respect to the first axis and the second axis; and
    a coil which is provided spaced apart from the displacement member and generates a magnetic field acting on the permanent magnet,
    wherein the displacement member defines a frame surrounding the movable plate and is oscillatably supported by the second torsion bar spring, and a damper unitary with the frame that has a smaller thickness than that of the frame and extends in a direction intersecting with a direction in which the second torsion bar spring extends from the frame; and
    wherein a length of the displacement member in a direction in which the first torsion bar spring extends is greater than a length of the displacement member in the direction in which the second torsion bar spring extends,
    wherein the displacement member includes another damper unitary with the frame that has a smaller thickness than that of the frame and extends in the direction intersecting with the direction in which the second torsion bar spring extends from the frame, and
    wherein the damper, the frame, and the another damper are disposed in this order on the displacement member in the direction intersecting with the direction in which the second torsion bar spring extends from the frame.

2. The optical scanner according to claim 1,
    wherein a thickness of the damper at a position separated from the second torsion bar spring is greater than a thickness of the damper at a position closer to the second torsion bar spring.

3. The optical scanner according to claim 2,
    wherein a projecting portion of the damper protrudes away from the permanent magnet with respect to the displacement member.

4. The optical scanner according to claim 1,
    wherein the displacement member includes a thin plate structure which has a smaller thickness than that of the frame and extends in a direction in which the second torsion bar spring extends from the frame, and a connector interconnecting the second torsion bar spring and the thin plate structure has a circular arc shape.

5. The optical scanner according to claim 1,
    wherein the light reflection unit includes a reflection plate and a support which supports the reflection plate, and the reflection plate and the displacement member are installed at an interval in a thickness direction of the reflection plate, and the reflection plate partially overlaps with the displacement member in a plan view.

6. The optical scanner according to claim 1, wherein the permanent magnet is bonded to the frame, and the damper extends from the frame.

7. An image display device comprising:
a light source which emits light; and
an optical scanner,
wherein the optical scanner includes:
   a movable plate which includes a light reflection unit which reflects light;
   a first torsion bar spring which oscillatably supports the movable plate around a first axis;
   a displacement member which is connected to the first torsion bar spring;
   a second torsion bar spring which oscillatably supports the displacement member around a second axis intersecting with the first axis;
   a permanent magnet which is provided on the displacement member so that a line connecting first and second magnetic poles of the permanent magnet is inclined with respect to the first axis and the second axis; and
   a coil which is provided spaced apart from the displacement member and generates a magnetic field acting on the permanent magnet, and
   the displacement member defines a frame surrounding the movable plate and is oscillatably supported by the second torsion bar spring, and a damper unitary with the frame that has a smaller thickness than that of the frame and extends in a direction intersecting with a direction in which the second torsion bar spring extends from the frame,
wherein a length of the displacement member in a direction in which the first torsion bar spring extends is greater than a length of the displacement member in the direction in which the second torsion bar spring extends,
wherein the displacement member includes another damper unitary with the frame that has a smaller thickness than that of the frame and extends in the direction intersecting with the direction in which the second torsion bar spring extends from the frame, and
wherein the damper, the frame, and the another damper are disposed in this order on the displacement member in the direction intersecting with the direction in which the second torsion bar spring extends from the frame.

8. The image display device according to claim 7 further comprising:
a frame to be mounted on a head of a viewer; and
wherein the optical scanner is provided on the frame so as to provide a head mount display.

9. The image display device according to claim 7 further comprising:
a dashboard of a vehicle; and
wherein the optical scanner is provided to the dashboard so as to provide a heads-up display which emits light on a windshield of the vehicle.

10. The image display device according to claim 7, wherein the permanent magnet is bonded to the frame, and the damper extends from the frame.

11. An optical scanner comprising:
a movable plate including a light reflection unit;
a first torsion bar spring oscillatably supporting the movable plate around a first axis;
a displacement member connected to the first torsion bar spring;
a second torsion bar spring oscillatably supporting the displacement member around a second axis orthogonal to the first axis;
a permanent magnet on the displacement member, the permanent magnet having first and second magnetic poles, a line connecting the first and second magnetic poles being inclined relative to the first and second axes; and
a coil spaced apart from the displacement member and generating a magnetic field acting on the permanent magnet,
wherein the displacement member includes:
   a frame surrounding the movable plate and oscillatably supported by the second torsion bar spring, and
   a damper that is unitary with the frame, and has a smaller thickness than the frame and extending orthogonal to the second torsion bar spring extends,
wherein a length of the displacement member in a direction in which the first torsion bar spring extends is greater than a length of the displacement member in the direction in which the second torsion bar spring extends,
wherein the displacement member includes another damper unitary with the frame that has a smaller thickness than that of the frame and extends in the direction intersecting with the direction in which the second torsion bar spring extends from the frame, and
wherein the damper, the frame, and the another damper are disposed in this order on the displacement member in the direction intersecting with the direction in which the second torsion bar spring extends from the frame.

12. The optical scanner according to claim 11, wherein a thickness of the damper increases at a position spaced apart from the second torsion bar spring.

13. The optical scanner according to claim 12, wherein a projecting portion of the damper protrudes away from the permanent magnet with respect to the displacement member.

14. The optical scanner according to claim 11, wherein the displacement member includes a thin plate structure having a smaller thickness than the frame and extends in the same direction as the second torsion bar spring, and an interconnection of the second torsion bar spring and the thin plate structure is curved.

15. The optical scanner according to claim 11, wherein the light reflection unit includes a reflection plate and a support supporting the reflection plate, and
the reflection plate and the displacement member are spaced apart in a thickness direction of the reflection plate, and the reflection plate partially overlaps the displacement member in a plan view.

16. The optical scanner according to claim 11, wherein the permanent magnet is bonded to the frame, and the damper extends from the frame.

* * * * *